United States Patent
Deshmukh et al.

(10) Patent No.: US 9,098,587 B2
(45) Date of Patent: Aug. 4, 2015

(54) VARIABLE DURATION NON-EVENT PATTERN MATCHING

(71) Applicant: Oracle International Corporation, Redwood Shores, CA (US)

(72) Inventors: Unmesh Anil Deshmukh, Nagpur (IN); Anand Srinivasan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 144 days.

(21) Appl. No.: 13/839,288

(22) Filed: Mar. 15, 2013

(65) Prior Publication Data

US 2014/0201225 A1   Jul. 17, 2014

Related U.S. Application Data

(60) Provisional application No. 61/752,855, filed on Jan. 15, 2013.

(51) Int. Cl.
*G06F 7/00* (2006.01)
*G06F 17/30* (2006.01)

(52) U.S. Cl.
CPC .... *G06F 17/30864* (2013.01); *G06F 17/30286* (2013.01)

(58) Field of Classification Search
CPC ............... G06F 17/30516; G06F 17/30864; G06F 17/30424; G06F 17/30551
See application file for complete search history.

(56) References Cited

U.S. PATENT DOCUMENTS

| 4,996,687 | A | 2/1991 | Hess et al. |
| 5,051,947 | A | 9/1991 | Messenger et al. |
| 5,495,600 | A | 2/1996 | Terry et al. |
| 5,706,494 | A | 1/1998 | Cochrane et al. |
| 5,802,262 | A | 9/1998 | Van De Vanter |
| 5,802,523 | A | 9/1998 | Jasuja et al. |
| 5,822,750 | A | 10/1998 | Jou et al. |

(Continued)

FOREIGN PATENT DOCUMENTS

| EP | 1 241 589 A2 | 9/2002 |
| EP | 2474922 | 7/2012 |

(Continued)

OTHER PUBLICATIONS

SQL Tutorial-In, Tizag.com, http://web.archive.org/web/20090216215219/http://www.tizag.com/sgiTutorial/sqlin.php, Feb. 16, 2009, pp. 1-3.

(Continued)

*Primary Examiner* — Tony Mahmoudi
*Assistant Examiner* — Tuan A Pham
(74) *Attorney, Agent, or Firm* — Kilpatrick Townsend and Stockton LLP

(57) ABSTRACT

Techniques for performing non-event pattern matching on continuous event streams using variable duration. The duration value used in non-event pattern matching can be variable. Accordingly, a first pattern match candidate can have a different associated duration from a second pattern match candidate for matches arising from events received via an event stream. In certain embodiments, the duration for a candidate pattern match may be based upon one or more attributes of an event that started the candidate pattern match or based upon an expression (e.g., an arithmetic expression) involving one or more attributes of the event.

17 Claims, 8 Drawing Sheets

(56) References Cited

U.S. PATENT DOCUMENTS

| | | |
|---|---|---|
| 5,826,077 A | 10/1998 | Blakeley et al. |
| 5,850,544 A | 12/1998 | Parvathaneny et al. |
| 5,857,182 A | 1/1999 | DeMichiel et al. |
| 5,918,225 A | 6/1999 | White et al. |
| 5,920,716 A | 7/1999 | Johnson et al. |
| 5,937,195 A | 8/1999 | Ju et al. |
| 5,937,401 A | 8/1999 | Hillegas et al. |
| 6,006,235 A | 12/1999 | Macdonald et al. |
| 6,011,916 A | 1/2000 | Moore et al. |
| 6,041,344 A | 3/2000 | Bodamer et al. |
| 6,081,801 A | 6/2000 | Cochrane et al. |
| 6,092,065 A | 7/2000 | Floratos et al. |
| 6,108,666 A | 8/2000 | Floratos et al. |
| 6,112,198 A | 8/2000 | Lohman et al. |
| 6,128,610 A | 10/2000 | Srinivasan et al. |
| 6,158,045 A | 12/2000 | You |
| 6,219,660 B1 | 4/2001 | Haderle et al. |
| 6,263,332 B1 | 7/2001 | Nasr et al. |
| 6,278,994 B1 | 8/2001 | Fuh et al. |
| 6,282,537 B1 | 8/2001 | Madnick et al. |
| 6,341,281 B1 | 1/2002 | MacNicol et al. |
| 6,353,821 B1 | 3/2002 | Gray et al. |
| 6,367,034 B1 | 4/2002 | Novik et al. |
| 6,370,537 B1 | 4/2002 | Gilbert et al. |
| 6,389,436 B1 | 5/2002 | Chakrabarti et al. |
| 6,397,262 B1 | 5/2002 | Hayden et al. |
| 6,418,448 B1 | 7/2002 | Sakar |
| 6,438,540 B2 | 8/2002 | Nasr et al. |
| 6,438,559 B1 | 8/2002 | White et al. |
| 6,439,783 B1 | 8/2002 | Antoshenkov |
| 6,449,620 B1 | 9/2002 | Draper et al. |
| 6,453,314 B1 | 9/2002 | Chan et al. |
| 6,507,834 B1 | 1/2003 | Kabra et al. |
| 6,523,102 B1 | 2/2003 | Dye et al. |
| 6,546,381 B1 | 4/2003 | Subramanian et al. |
| 6,615,203 B1 | 9/2003 | Lin et al. |
| 6,681,343 B1 | 1/2004 | Nakabo |
| 6,708,186 B1 | 3/2004 | Claborn et al. |
| 6,718,278 B1 | 4/2004 | Steggles |
| 6,748,386 B1 | 6/2004 | Li |
| 6,751,619 B1 | 6/2004 | Rowstron et al. |
| 6,766,330 B1 | 7/2004 | Chen et al. |
| 6,785,677 B1 | 8/2004 | Fritchman |
| 6,826,566 B2 | 11/2004 | Lewak et al. |
| 6,836,778 B2 | 12/2004 | Manikutty et al. |
| 6,850,925 B2 | 2/2005 | Chaudhuri et al. |
| 6,856,981 B2 | 2/2005 | Wyschogrod et al. |
| 6,985,904 B1 | 1/2006 | Kaluskar et al. |
| 6,996,557 B1 | 2/2006 | Leung et al. |
| 7,020,696 B1 | 3/2006 | Perry et al. |
| 7,047,249 B1 | 5/2006 | Vincent |
| 7,051,034 B1 | 5/2006 | Ghosh et al. |
| 7,062,749 B2 | 6/2006 | Cyr et al. |
| 7,080,062 B1 | 7/2006 | Leung et al. |
| 7,093,023 B2 | 8/2006 | Lockwood et al. |
| 7,145,938 B2 | 12/2006 | Takeuchi et al. |
| 7,146,352 B2 | 12/2006 | Brundage et al. |
| 7,167,848 B2 | 1/2007 | Boukouvalas et al. |
| 7,203,927 B2 | 4/2007 | Al-Azzawe et al. |
| 7,224,185 B2 | 5/2007 | Campbell et al. |
| 7,225,188 B1 | 5/2007 | Gai et al. |
| 7,236,972 B2 | 6/2007 | Lewak et al. |
| 7,305,391 B2 | 12/2007 | Wyschogrod et al. |
| 7,308,561 B2 | 12/2007 | Cornet et al. |
| 7,310,638 B1 | 12/2007 | Blair |
| 7,376,656 B2 | 5/2008 | Blakeley et al. |
| 7,383,253 B1 | 6/2008 | Tsimelzon et al. |
| 7,403,959 B2 | 7/2008 | Nishizawa et al. |
| 7,430,549 B2 | 9/2008 | Zane et al. |
| 7,451,143 B2 | 11/2008 | Sharangpani et al. |
| 7,475,058 B2 | 1/2009 | Kakivaya et al. |
| 7,483,976 B2 | 1/2009 | Ross |
| 7,516,121 B2 | 4/2009 | Liu et al. |
| 7,519,577 B2 | 4/2009 | Brundage et al. |
| 7,519,962 B2 | 4/2009 | Aman |
| 7,533,087 B2 | 5/2009 | Liu et al. |
| 7,546,284 B1 | 6/2009 | Martinez et al. |
| 7,552,365 B1 | 6/2009 | Marsh et al. |
| 7,567,953 B2 | 7/2009 | Kadayam et al. |
| 7,580,946 B2 | 8/2009 | Mansour et al. |
| 7,587,383 B2 | 9/2009 | Koo et al. |
| 7,603,674 B2 | 10/2009 | Cyr et al. |
| 7,613,848 B2 | 11/2009 | Amini et al. |
| 7,620,851 B1 | 11/2009 | Leavy et al. |
| 7,630,982 B2 | 12/2009 | Boyce et al. |
| 7,634,501 B2 | 12/2009 | Yabloko |
| 7,636,703 B2 | 12/2009 | Taylor et al. |
| 7,644,066 B2 | 1/2010 | Krishnaprasad et al. |
| 7,653,645 B1 | 1/2010 | Stokes |
| 7,672,964 B1 | 3/2010 | Yan et al. |
| 7,673,065 B2 | 3/2010 | Srinivasan et al. |
| 7,676,461 B2 | 3/2010 | Chkodrov et al. |
| 7,689,622 B2 | 3/2010 | Liu et al. |
| 7,693,891 B2 | 4/2010 | Stokes et al. |
| 7,702,629 B2 | 4/2010 | Cytron et al. |
| 7,702,639 B2 | 4/2010 | Stanley et al. |
| 7,711,782 B2 | 5/2010 | Kim et al. |
| 7,716,210 B2 | 5/2010 | Ozcan et al. |
| 7,739,265 B2 | 6/2010 | Jain et al. |
| 7,805,445 B2 | 9/2010 | Boyer et al. |
| 7,814,111 B2 | 10/2010 | Levin |
| 7,823,066 B1 | 10/2010 | Kuramura |
| 7,827,146 B1 | 11/2010 | De Landstheer et al. |
| 7,827,190 B2 | 11/2010 | Pandya et al. |
| 7,844,829 B2 | 11/2010 | Meenakshisundaram |
| 7,870,124 B2 | 1/2011 | Liu et al. |
| 7,877,381 B2 | 1/2011 | Ewen et al. |
| 7,895,187 B2 | 2/2011 | Bowman |
| 7,912,853 B2 | 3/2011 | Agrawal |
| 7,917,299 B2 | 3/2011 | Buhler et al. |
| 7,930,322 B2 | 4/2011 | Maclennan |
| 7,945,540 B2 | 5/2011 | Park et al. |
| 7,953,728 B2 | 5/2011 | Hu et al. |
| 7,954,109 B1 | 5/2011 | Durham et al. |
| 7,979,420 B2 | 7/2011 | Jain et al. |
| 7,987,204 B2 | 7/2011 | Stokes |
| 7,988,817 B2 | 8/2011 | Son |
| 7,991,766 B2 | 8/2011 | Srinivasan et al. |
| 7,996,388 B2 | 8/2011 | Jain et al. |
| 8,019,747 B2 | 9/2011 | Srinivasan et al. |
| 8,032,544 B2 | 10/2011 | Jing et al. |
| 8,046,747 B2 | 10/2011 | Cyr et al. |
| 8,073,826 B2 | 12/2011 | Srinivasan et al. |
| 8,099,400 B2 | 1/2012 | Haub et al. |
| 8,103,655 B2 | 1/2012 | Srinivasan et al. |
| 8,122,006 B2 | 2/2012 | de Castro Alves et al. |
| 8,134,184 B2 | 3/2012 | Becker et al. |
| 8,145,859 B2 | 3/2012 | Park et al. |
| 8,155,880 B2 | 4/2012 | Patel et al. |
| 8,195,648 B2 | 6/2012 | Zabback et al. |
| 8,204,873 B2 | 6/2012 | Chavan |
| 8,204,875 B2 | 6/2012 | Srinivasan et al. |
| 8,290,776 B2 | 10/2012 | Moriwaki et al. |
| 8,296,316 B2 | 10/2012 | Jain et al. |
| 8,315,990 B2 | 11/2012 | Barga et al. |
| 8,316,012 B2 | 11/2012 | Abouzied et al. |
| 8,321,450 B2 | 11/2012 | Thatte et al. |
| 8,346,511 B2 | 1/2013 | Schoning et al. |
| 8,352,517 B2 | 1/2013 | Park et al. |
| 8,386,466 B2 | 2/2013 | Park et al. |
| 8,387,076 B2 | 2/2013 | Thatte et al. |
| 8,392,402 B2 | 3/2013 | Mihaila et al. |
| 8,447,744 B2 | 5/2013 | De Castro Alves et al. |
| 8,458,175 B2 | 6/2013 | Stokes |
| 8,498,956 B2 | 7/2013 | Srinivasan et al. |
| 8,521,867 B2 | 8/2013 | Srinivasan et al. |
| 8,527,458 B2 | 9/2013 | Park et al. |
| 8,543,558 B2 | 9/2013 | Srinivasan et al. |
| 8,572,589 B2 | 10/2013 | Cataldo et al. |
| 8,589,436 B2 | 11/2013 | Srinivasan et al. |
| 8,676,841 B2 | 3/2014 | Srinivasan et al. |
| 8,713,049 B2 | 4/2014 | Jain et al. |
| 8,762,369 B2 | 6/2014 | Macho et al. |
| 8,775,412 B2 | 7/2014 | Day et al. |

(56) References Cited

U.S. PATENT DOCUMENTS

| | | |
|---|---|---|
| 2002/0023211 A1 | 2/2002 | Roth et al. |
| 2002/0032804 A1 | 3/2002 | Hunt |
| 2002/0038313 A1 | 3/2002 | Klein et al. |
| 2002/0049788 A1 | 4/2002 | Lipkin |
| 2002/0116362 A1 | 8/2002 | Li et al. |
| 2002/0116371 A1 | 8/2002 | Dodds et al. |
| 2002/0133484 A1 | 9/2002 | Chau et al. |
| 2002/0169788 A1 | 11/2002 | Lee et al. |
| 2003/0037048 A1 | 2/2003 | Kabra et al. |
| 2003/0046673 A1 | 3/2003 | Copeland et al. |
| 2003/0065655 A1 | 4/2003 | Syeda-mahmood |
| 2003/0065659 A1 | 4/2003 | Agarwal et al. |
| 2003/0120682 A1 | 6/2003 | Bestgen et al. |
| 2003/0135304 A1 | 7/2003 | Sroub et al. |
| 2003/0200198 A1 | 10/2003 | Chandrasekar et al. |
| 2003/0229652 A1 | 12/2003 | Bakalash et al. |
| 2003/0236766 A1 | 12/2003 | Fortuna et al. |
| 2004/0010496 A1 | 1/2004 | Behrendt et al. |
| 2004/0019592 A1 | 1/2004 | Crabtree |
| 2004/0024773 A1 | 2/2004 | Stoffel et al. |
| 2004/0064466 A1 | 4/2004 | Manikutty et al. |
| 2004/0073534 A1 | 4/2004 | Robson |
| 2004/0088404 A1 | 5/2004 | Aggarwal |
| 2004/0117359 A1 | 6/2004 | Snodgrass et al. |
| 2004/0136598 A1 | 7/2004 | Le Leannec et al. |
| 2004/0151382 A1 | 8/2004 | Stellenberg et al. |
| 2004/0153329 A1 | 8/2004 | Casati et al. |
| 2004/0167864 A1 | 8/2004 | Wang et al. |
| 2004/0168107 A1 | 8/2004 | Sharp et al. |
| 2004/0177053 A1 | 9/2004 | Donoho et al. |
| 2004/0201612 A1 | 10/2004 | Hild et al. |
| 2004/0205082 A1 | 10/2004 | Fontoura et al. |
| 2004/0220896 A1 | 11/2004 | Finlay et al. |
| 2004/0220912 A1 | 11/2004 | Manikutty et al. |
| 2004/0220927 A1 | 11/2004 | Murthy et al. |
| 2004/0267760 A1 | 12/2004 | Brundage et al. |
| 2004/0268314 A1 | 12/2004 | Kollman et al. |
| 2005/0010896 A1 | 1/2005 | Meliksetian et al. |
| 2005/0055338 A1 | 3/2005 | Warner et al. |
| 2005/0065949 A1 | 3/2005 | Warner et al. |
| 2005/0096124 A1 | 5/2005 | Stronach |
| 2005/0097128 A1 | 5/2005 | Ryan et al. |
| 2005/0120016 A1 | 6/2005 | Midgley |
| 2005/0154740 A1 | 7/2005 | Day et al. |
| 2005/0174940 A1 | 8/2005 | Iny |
| 2005/0177579 A1 | 8/2005 | Blakeley et al. |
| 2005/0204340 A1 | 9/2005 | Ruminer et al. |
| 2005/0229158 A1 | 10/2005 | Thusoo et al. |
| 2005/0273450 A1 | 12/2005 | McMillen et al. |
| 2005/0289125 A1 | 12/2005 | Liu et al. |
| 2006/0007308 A1 | 1/2006 | Ide et al. |
| 2006/0015482 A1 | 1/2006 | Beyer et al. |
| 2006/0031204 A1 | 2/2006 | Liu et al. |
| 2006/0047696 A1 | 3/2006 | Larson et al. |
| 2006/0064487 A1 | 3/2006 | Ross |
| 2006/0080646 A1 | 4/2006 | Aman |
| 2006/0085592 A1 | 4/2006 | Ganguly et al. |
| 2006/0089939 A1 | 4/2006 | Broda et al. |
| 2006/0100969 A1 | 5/2006 | Wang et al. |
| 2006/0106786 A1 | 5/2006 | Day et al. |
| 2006/0106797 A1 | 5/2006 | Srinivasa et al. |
| 2006/0129554 A1* | 6/2006 | Suyama et al. .................. 707/6 |
| 2006/0155719 A1 | 7/2006 | Mihaeli et al. |
| 2006/0167704 A1 | 7/2006 | Nicholls et al. |
| 2006/0167856 A1 | 7/2006 | Angele et al. |
| 2006/0212441 A1 | 9/2006 | Tang et al. |
| 2006/0224576 A1 | 10/2006 | Liu et al. |
| 2006/0230029 A1 | 10/2006 | Yan |
| 2006/0235840 A1 | 10/2006 | Manikutty et al. |
| 2006/0242180 A1 | 10/2006 | Graf et al. |
| 2006/0282429 A1 | 12/2006 | Hernandez-Sherrington et al. |
| 2006/0294095 A1 | 12/2006 | Berk et al. |
| 2007/0016467 A1 | 1/2007 | John et al. |
| 2007/0022092 A1 | 1/2007 | Nishizawa et al. |
| 2007/0039049 A1 | 2/2007 | Kupferman et al. |
| 2007/0050340 A1 | 3/2007 | Von Kaenel et al. |
| 2007/0076314 A1* | 4/2007 | Rigney .......................... 360/51 |
| 2007/0118600 A1 | 5/2007 | Arora |
| 2007/0136239 A1 | 6/2007 | Lee et al. |
| 2007/0136254 A1 | 6/2007 | Choi et al. |
| 2007/0156964 A1 | 7/2007 | Sistla |
| 2007/0192301 A1 | 8/2007 | Posner |
| 2007/0198479 A1 | 8/2007 | Cai et al. |
| 2007/0226188 A1 | 9/2007 | Johnson et al. |
| 2007/0226239 A1 | 9/2007 | Johnson et al. |
| 2007/0271280 A1 | 11/2007 | Chandasekaran |
| 2007/0294217 A1 | 12/2007 | Chen et al. |
| 2008/0005093 A1 | 1/2008 | Liu et al. |
| 2008/0010093 A1 | 1/2008 | LaPlante et al. |
| 2008/0010241 A1 | 1/2008 | Mcgoveran |
| 2008/0016095 A1 | 1/2008 | Bhatnagar et al. |
| 2008/0028095 A1 | 1/2008 | Lang et al. |
| 2008/0033914 A1 | 2/2008 | Cherniack et al. |
| 2008/0034427 A1 | 2/2008 | Cadambi et al. |
| 2008/0046401 A1 | 2/2008 | Lee et al. |
| 2008/0071904 A1* | 3/2008 | Schuba et al. .................. 709/224 |
| 2008/0077570 A1 | 3/2008 | Tang et al. |
| 2008/0077587 A1 | 3/2008 | Wyschogrod et al. |
| 2008/0082484 A1 | 4/2008 | Averbuch et al. |
| 2008/0082514 A1 | 4/2008 | Khorlin et al. |
| 2008/0086321 A1 | 4/2008 | Walton |
| 2008/0098359 A1 | 4/2008 | Ivanov et al. |
| 2008/0110397 A1 | 5/2008 | Son |
| 2008/0114787 A1 | 5/2008 | Kashiyama et al. |
| 2008/0120283 A1 | 5/2008 | Liu et al. |
| 2008/0120321 A1 | 5/2008 | Liu et al. |
| 2008/0162583 A1 | 7/2008 | Brown et al. |
| 2008/0195577 A1 | 8/2008 | Fan et al. |
| 2008/0235298 A1 | 9/2008 | Lin et al. |
| 2008/0243451 A1 | 10/2008 | Feblowitz et al. |
| 2008/0243675 A1 | 10/2008 | Parsons et al. |
| 2008/0250073 A1 | 10/2008 | Nori et al. |
| 2008/0255847 A1 | 10/2008 | Moriwaki et al. |
| 2008/0263039 A1 | 10/2008 | Van Lunteren |
| 2008/0270764 A1 | 10/2008 | McMillen et al. |
| 2008/0281782 A1 | 11/2008 | Agrawal |
| 2008/0301124 A1 | 12/2008 | Alves et al. |
| 2008/0301125 A1 | 12/2008 | Alves et al. |
| 2008/0301135 A1 | 12/2008 | Alves et al. |
| 2008/0301256 A1 | 12/2008 | Mcwilliams et al. |
| 2008/0313131 A1 | 12/2008 | Friedman et al. |
| 2009/0006320 A1 | 1/2009 | Ding et al. |
| 2009/0006346 A1 | 1/2009 | C N et al. |
| 2009/0007098 A1 | 1/2009 | Chevrette et al. |
| 2009/0019045 A1 | 1/2009 | Amir et al. |
| 2009/0024622 A1 | 1/2009 | Chkodrov et al. |
| 2009/0043729 A1 | 2/2009 | Liu et al. |
| 2009/0070355 A1 | 3/2009 | Cadarette et al. |
| 2009/0070785 A1 | 3/2009 | Alvez et al. |
| 2009/0070786 A1 | 3/2009 | Alves et al. |
| 2009/0076899 A1 | 3/2009 | Gbodimowo |
| 2009/0088962 A1 | 4/2009 | Jones |
| 2009/0100029 A1 | 4/2009 | Jain et al. |
| 2009/0106189 A1 | 4/2009 | Jain et al. |
| 2009/0106190 A1 | 4/2009 | Srinivasan et al. |
| 2009/0106198 A1 | 4/2009 | Srinivasan et al. |
| 2009/0106214 A1 | 4/2009 | Jain et al. |
| 2009/0106215 A1 | 4/2009 | Jain et al. |
| 2009/0106218 A1 | 4/2009 | Srinivasan et al. |
| 2009/0106321 A1 | 4/2009 | Das et al. |
| 2009/0106440 A1 | 4/2009 | Srinivasan et al. |
| 2009/0112802 A1 | 4/2009 | Srinivasan et al. |
| 2009/0112803 A1 | 4/2009 | Srinivasan et al. |
| 2009/0112853 A1 | 4/2009 | Nishizawa et al. |
| 2009/0125550 A1 | 5/2009 | Barga et al. |
| 2009/0144696 A1 | 6/2009 | Andersen |
| 2009/0172014 A1 | 7/2009 | Huetter |
| 2009/0187584 A1 | 7/2009 | Johnson et al. |
| 2009/0216747 A1 | 8/2009 | Li et al. |
| 2009/0216860 A1 | 8/2009 | Li et al. |
| 2009/0228434 A1 | 9/2009 | Krishnamurthy et al. |
| 2009/0245236 A1 | 10/2009 | Scott et al. |
| 2009/0248749 A1 | 10/2009 | Gu et al. |
| 2009/0254522 A1 | 10/2009 | Chaudhuri et al. |

(56) References Cited

U.S. PATENT DOCUMENTS

| | | |
|---|---|---|
| 2009/0257314 A1 | 10/2009 | Davis et al. |
| 2009/0265324 A1 | 10/2009 | Mordvinov et al. |
| 2009/0293046 A1 | 11/2009 | Cheriton |
| 2009/0300093 A1 | 12/2009 | Griffiths et al. |
| 2009/0300181 A1 | 12/2009 | Marques |
| 2009/0300580 A1 | 12/2009 | Heyhoe et al. |
| 2009/0300615 A1 | 12/2009 | Andrade et al. |
| 2009/0313198 A1 | 12/2009 | Kudo |
| 2009/0327102 A1 | 12/2009 | Maniar et al. |
| 2010/0017379 A1 | 1/2010 | Naibo et al. |
| 2010/0017380 A1 | 1/2010 | Naibo et al. |
| 2010/0023498 A1 | 1/2010 | Dettinger et al. |
| 2010/0036831 A1 | 2/2010 | Vemuri et al. |
| 2010/0049710 A1 | 2/2010 | Young, Jr. et al. |
| 2010/0057663 A1 | 3/2010 | Srinivasan et al. |
| 2010/0057727 A1 | 3/2010 | Srinivasan et al. |
| 2010/0057735 A1 | 3/2010 | Srinivasan et al. |
| 2010/0057736 A1 | 3/2010 | Srinivasan et al. |
| 2010/0057737 A1* | 3/2010 | Srinivasan et al. ............. 707/6 |
| 2010/0094838 A1 | 4/2010 | Kozak |
| 2010/0106946 A1 | 4/2010 | Imaki et al. |
| 2010/0125584 A1 | 5/2010 | Navas |
| 2010/0161589 A1 | 6/2010 | Nica et al. |
| 2010/0223305 A1 | 9/2010 | Park et al. |
| 2010/0223437 A1 | 9/2010 | Park et al. |
| 2010/0223606 A1 | 9/2010 | Park et al. |
| 2010/0312756 A1 | 12/2010 | Zhang et al. |
| 2010/0318652 A1 | 12/2010 | Samba |
| 2011/0004621 A1 | 1/2011 | Kelley et al. |
| 2011/0016160 A1 | 1/2011 | Zhang et al. |
| 2011/0022618 A1 | 1/2011 | Thatte et al. |
| 2011/0023055 A1 | 1/2011 | Thatte et al. |
| 2011/0029484 A1 | 2/2011 | Park et al. |
| 2011/0029485 A1 | 2/2011 | Park et al. |
| 2011/0040746 A1 | 2/2011 | Handa et al. |
| 2011/0055192 A1 | 3/2011 | Tang et al. |
| 2011/0055197 A1 | 3/2011 | Chavan |
| 2011/0093162 A1 | 4/2011 | Nielsen et al. |
| 2011/0105857 A1* | 5/2011 | Zhang et al. ............. 600/300 |
| 2011/0161321 A1 | 6/2011 | De Castro et al. |
| 2011/0161328 A1 | 6/2011 | Park et al. |
| 2011/0161352 A1 | 6/2011 | De Castro et al. |
| 2011/0161356 A1 | 6/2011 | De Castro et al. |
| 2011/0161397 A1 | 6/2011 | Bekiares et al. |
| 2011/0173231 A1 | 7/2011 | Drissi et al. |
| 2011/0173235 A1 | 7/2011 | Aman et al. |
| 2011/0196891 A1 | 8/2011 | De Castro et al. |
| 2011/0270879 A1 | 11/2011 | Srinivasan et al. |
| 2011/0302164 A1 | 12/2011 | Krishnamurthy et al. |
| 2011/0314019 A1 | 12/2011 | Jimenez Peris et al. |
| 2011/0321057 A1 | 12/2011 | Mejdrich et al. |
| 2012/0041934 A1 | 2/2012 | Srinivasan et al. |
| 2012/0072455 A1 | 3/2012 | Jain et al. |
| 2012/0130963 A1 | 5/2012 | Luo et al. |
| 2012/0166421 A1 | 6/2012 | Cammert et al. |
| 2012/0166469 A1 | 6/2012 | Cammert et al. |
| 2012/0191697 A1 | 7/2012 | Sherman et al. |
| 2012/0233107 A1 | 9/2012 | Roesch et al. |
| 2012/0259910 A1 | 10/2012 | Andrade et al. |
| 2012/0278473 A1 | 11/2012 | Griffiths |
| 2012/0284420 A1 | 11/2012 | Shukla et al. |
| 2012/0290715 A1 | 11/2012 | Dinger et al. |
| 2012/0291049 A1 | 11/2012 | Park et al. |
| 2012/0324453 A1 | 12/2012 | Chandramouli et al. |
| 2013/0014088 A1 | 1/2013 | Park et al. |
| 2013/0046725 A1 | 2/2013 | Cammert et al. |
| 2013/0117317 A1 | 5/2013 | Wolf |
| 2013/0144866 A1 | 6/2013 | Jerzak et al. |
| 2013/0191370 A1 | 7/2013 | Chen et al. |
| 2013/0332240 A1 | 12/2013 | Patri et al. |
| 2014/0095444 A1 | 4/2014 | Deshmukh et al. |
| 2014/0095445 A1 | 4/2014 | Deshmukh et al. |
| 2014/0095446 A1 | 4/2014 | Deshmukh et al. |
| 2014/0095447 A1 | 4/2014 | Deshmukh et al. |
| 2014/0095462 A1 | 4/2014 | Park et al. |
| 2014/0095471 A1 | 4/2014 | Deshmukh et al. |
| 2014/0095473 A1 | 4/2014 | Srinivasan et al. |
| 2014/0095483 A1 | 4/2014 | Toillion et al. |
| 2014/0095525 A1 | 4/2014 | Hsiao et al. |
| 2014/0095529 A1 | 4/2014 | Deshmukh et al. |
| 2014/0095533 A1 | 4/2014 | Shukla et al. |
| 2014/0095535 A1 | 4/2014 | Deshmukh et al. |
| 2014/0095537 A1 | 4/2014 | Park et al. |
| 2014/0095540 A1 | 4/2014 | Hsiao et al. |
| 2014/0095541 A1 | 4/2014 | Herwadkar et al. |
| 2014/0095543 A1 | 4/2014 | Hsiao et al. |
| 2014/0136514 A1 | 5/2014 | Jain et al. |
| 2014/0156683 A1 | 6/2014 | de Castro Alves |
| 2014/0172914 A1 | 6/2014 | Elnikety et al. |
| 2014/0201355 A1 | 7/2014 | Bishnoi et al. |
| 2014/0236983 A1 | 8/2014 | Alves et al. |
| 2014/0237289 A1 | 8/2014 | de Castro Alves et al. |
| 2014/0358959 A1 | 12/2014 | Bishnoi et al. |
| 2014/0379712 A1 | 12/2014 | Lafuente Alvarez |

FOREIGN PATENT DOCUMENTS

| | | |
|---|---|---|
| WO | 00/49533 A2 | 8/2000 |
| WO | WO01/18712 A1 | 3/2001 |
| WO | 01/59602 A1 | 8/2001 |
| WO | 01/65418 A1 | 9/2001 |
| WO | 03/030031 A2 | 4/2003 |
| WO | WO2007122347 | 11/2007 |
| WO | 2012/037511 A1 | 3/2012 |
| WO | 2012050582 | 4/2012 |
| WO | 2012/154408 A1 | 11/2012 |
| WO | 2012158360 A1 | 11/2012 |

OTHER PUBLICATIONS

U.S. Appl. No. 12/548,187, Final Office Action, dated Jun. 10, 2013, 18 pages.

U.S. Appl. No. 12/548,222, Notice of Allowance, dated Jul. 18, 2013, 12 pages.

U.S. Appl. No. 13/102,665, Final Office Action, dated Jul. 9, 2013, 17 pages.

U.S. Appl. No. 13/107,742, Final Office Action, dated Jul. 3, 2013, 19 pages.

Notice of Allowance for U.S. Appl. No. 11/977,437 dated Jul. 10, 2013, 10 pages.

Final Office Action for U.S. Appl. No. 12/548,281 dated Oct. 10, 2013, 21 pages.

Notice of Allowance for U.S. Appl. No. 12/548,290 dated Sep. 11, 2013, 6 pages.

Final Office Action for U.S. Appl. No. 13/089,556 dated Aug. 29, 2013, 10 pages.

Final Office Action for U.S. Appl. No. 12/949,081 dated Aug. 27, 2013, 12 pages.

Notice of Allowance for U.S. Appl. No. 13/193,377 dated Aug. 30, 2013, 18 pages.

Non-Final Office Action for U.S. Appl. No. 13/177,748 dated Aug. 30, 2013, 23 pages.

"Supply Chain Event Management: Real-Time Supply Chain Event Management," product information Manhattan Associates (copyright 2009-2012) one page.

Fantozzi "A Strategic Approach to Supply Chain Event Management," student submission for Masters Degree, Massachusetts Institute of Technology (Jun. 2003) 36 pages.

Oracle™ Complex Event Processing CQL Language Reference, 11g Release 1 (11.1.1.4.0) E12048-04,(Jan. 2011), pp. title page, iii-xxxviii, 1-1 to 4-26, 6-1 to 6-12, 18-1 to 20-26, Index-1 to Index-14.

U.S. Appl. No. 13/838,259, filed Mar. 15, 2013, Deshmukh et al.

Oracle™ Complex Event Processing CQL Language Reference, 11g Release 1 (11.1.1) E12048-03, (Apr. 2010) pp. 18-1 to 18.9.5.

Oracle™ Fusion Middleware CQL Language Reference, 11g Release 1 (11.1.1.6.3) E12048-10, (Aug. 2012) pp. title page, iii-xxxvi, 1-1 to 4-26, 6-1 to 6-12, 18-1 to 20-26, Index-1 to Index-14.

Pradhan "Implementing and Configuring SAP® Event Management" Galileo Press, pp. 17-21 (copyright 2010).

(56) References Cited

OTHER PUBLICATIONS

Wilson "SAP Event Management, an Overview," Q Data USA, Inc.( copyright 2009) 16 pages.
Oracle Application Server, Enterprise Deployment Guide, 10g Release 3 (10.1.3.2.0), B32125-02, Oracle, Apr. 2007, 120 pages.
Oracle Database, SQL Language Reference 11 g Release 1 (11.1), B28286-02, Oracle, Sep. 2007, 1496 pages.
Esper Reference Documentation, Copyright 2007, Ver. 1.12.0, 2007, 158 pages.
Stream Query Repository: Online Auctions, at URL: http://www-db.stanford.edu/stream/sqr/onauc.html#queryspecsend, Dec. 2, 2002, 2 pages.
Esper Reference Documentation, Copyright 2008, ver. 2.0.0, 2008, 202 pages.
Oracle Database Data Cartridge Developer's Guide, B28425-03, 11 g Release 1 (11.1), Oracle, Mar. 2008, 372 pages.
Oracle Application Server, Administrator's Guide, 10g Release 3 (10.1.3.2.0), B32196-01, Oracle., Jan. 2007, 376 pages.
Oracle Application Server 10g, Release 2 and 3, New Features Overview, An Oracle White Paper, Oracle., Oct. 2005, 48 pages.
Oracle Database, SQL Reference, lOg Release 1 (10.1), Part No. B10759-01, Dec. 2003, pp. 7-1 to 7-17; 7-287 to 7-290; 14-61 to 14-74.
Business Process Management (BPM), Datasheet [online]. IBM, [retrieved on Jan. 28, 2013]. Retrieved from the Internet: <URL: http://www-142.ibm.com/software/products/us/en/category/BPM-SOFTWARE>.
Complex Event Processing in the Real World, An Oracle White Paper., Sep. 2007, 13 pages.
Coral8 Complex Event Processing Technology Overview, Coral8, Inc., Make it Continuous, Copyright 2007 Coral8, Inc., 2007, pp. 1-8.
"Creating WebLogic Domains Using the Configuration Wizard.", BEA Products, Version. 10.0, Dec. 2007, 78.
"Creating Weblogic Event Server Applications.", BEA WebLogic Event Server, Version. 2.0, Jul. 2007, 90 pages.
Dependency Injection, Wikipedia, printed on Apr. 29, 2011, at URL: D http:en.wikipedia.org/w/index.php?title=DependencLinjection &0ldid=260831402,, Dec. 30, 2008, pp. 1-7.
Deploying Applications to WebLogic Server, BEA WebLogic Server, ver. D 10.0, Mar. 30, 2007, 164 pages.
Developing Applications with Weblogic Server, BEA WebLogic Server, ver. D 10.0, Mar. 30, 2007, 254 pages.
EPL Reference, BEA WebLogic Event Server, ver. 2.0, Jul. 2007, 82 pages.
Esper Reference Documentation Version 3.1.0, EsperTech, retrieved from internet at URL: http://esper.codehaus.org/esper-3.1.0/doc/reference/en/pdf/esper_reference.pdf, 2009, 293 pages.
Fast Track Deployment and Administrator Guide for BEA WebLogic Server, BEA WebLogic Server 10.0 Documentation, printed on May 10, 2010, at URL:http://download.oracle.com/docs/cd/E13222_01/wls/docs1 OO/quickstart/quick_start. html, May 10, 2010, 1page.
Getting Started with WebLogic Event Server, BEA WebLogic Event Serverver 2.0, Jul. 2007, 66 pages.
High Availability Guide, Oracle Application Server, 10g Release 3 (10.1.3.2.0), B32201-01, Jan. 2007, 314 pages.
Installing Weblogic Real Time, BEA WebLogic Real Time, Ver. 2.0, Jul. 2007, 64 pages.
Introduction to BEA WebLogic Server and BEA WebLogic Express, BEA WebLogic Server, Ver. 10.0, Mar. 2007, 34 pages.
Introduction to WebLogic Real Time, BEA WebLogic Real Time, ver. 2.0,, Jul. 2007, 20 pages.
Jboss Enterprise Application Platform 4.3 Getting Started Guide CP03, for Use with Jboss Enterprise Application Platform 4.3 Cumulative Patch 3, Jboss a division of Red Hat, Red Hat Documentation Group, Copyright 2008, Red Hat, Inc., Sep. 2007, 68 pages.
Managing Server Startup and Shutdown, BEA WebLogic Server, ver. 10.0, Mar. 30, 2007, 134 pages.
Matching Behavior, .Net Framework Developer's Guide, Microsoft Corporation, Retrieved on: Jul. 1, 2008, URL: http://msdn.microsoft.com/en-us/library/Oyzc2ybO(pri nter).aspx, 2008, pp. 1-2.

New Project Proposal for Row Pattern Recognition—Amendment to SQL with Application to Streaming Data Queries, H2-2008-027, H2 Teleconference Meeting, Jan. 9, 2008, pp. 1-6.
Oracle CEP Getting Started, Release 11 gR1 (11.1.1) E14476-01, May 2009, 172 pages.
Oracle Complex Event Processing CQL Language Reference, 11g Release 1 (11.1.1) E12048-01, Apr. 2010, 540 pages.
OSGI Service Platform Core Specification, The OSGI Alliance, OSGI Alliance, ver. 4.1, release 4, Apr. 2007, 288 pages.
Release Notes, BEA WebLogic Event Server, Ver. 2.0, Jul. 2007, 8 pages.
Spring Dynamic Modules for OSGi Service Platforms product documentation, SpringSource, D, Jan. 2008, 71 pages.
Stream Base New and Noteworthy, Stream Base, Jan. 1, 2010, 878 pages.
Stream: The Stanford Stream Data Manager, IEEE Data Engineering Bulletin., Mar. 2003, pp. 1-8.
Stream: The Stanford Stream Data Manager, Retrieved from: URL: http://infolab.stanford.edu/stream/, Jan. 5, 2006, pp. 1-9.
Understanding Domain Configuration, BEA WebLogic Server, Ver. 10.0, Mar. 30, 2007, 38 pages.
WebLogic Event Server Administration and Configuration Guide, BEA WebLogic Event D Server, Version. 2.0, Jul. 2007, 108 pages.
WebLogic Event Server Reference, BEA WebLogic Event Server, Version. 2.0, Jul. 2007, 52 pages.
Weblogic Server Performance and Tuning, BEA WebLogic Server, Ver. 10.0, Mar. 30, 2007, 180 pages.
WebSphere Application Server V6.1 Problem Determination: IBM Redpaper Collection, WebSphere Software, IBM/Redbooks, Dec. 2007, 634 pages.
What is BPM?, Datasheet [online]. IBM, [retrieved on Jan. 28, 2013]. Retrieved from the Internet: <URL: http://www-01.ibm.com/software/info/bpm/whatis-bpm/>.
U.S. Appl. No. 10/948,523, Final Office Action mailed on Jul. 6, 2007, 5 pages.
U.S. Appl. No. 10/948,523, Non-Final Office Action mailed on Dec. 11, 2007, 48 pages.
U.S. Appl. No. 10/948,523, Notice of Allowance mailed on Dec. 1, 2010, 15 pages.
U.S. Appl. No. 10/948,523, Notice of Allowance mailed on Jul. 8, 2008, 30 pages.
U.S. Appl. No. 10/948,523, Non-Final Office Action mailed on Jan. 22, 200731 pages.
U.S. Appl. No. 10/948,523, Supplemental Notice of Allowance mailed on Jul. 17, 2008, 17 pages.
U.S. Appl. No. 10/948,523, Supplemental Notice of Allowance mailed on Aug. 25, 2008, 3 pages.
U.S. Appl. No. 11/601,415, Final Office Action mailed on Jul. 2, 2012, 59 pages.
U.S. Appl. No. 11/601,415, Final Office Action mailed on May 27, 2009, 27 pages.
U.S. Appl. No. 11/601,415, Final Office Action mailed on Jun. 30, 2010, 45 pages.
U.S. Appl. No. 11/601,415, Non-Final Office Action mailed on Sep. 17, 2008, 10 pages.
U.S. Appl. No. 11/601,415, Non-Final Office Action mailed on Nov. 30, 2009, 32 pages.
U.S. Appl. No. 11/601,415, Office Action mailed on Dec. 9, 2011.
U.S. Appl. No. 11/873,407, Final Office Action mailed on Apr. 26, 2010, 11 pages.
U.S. Appl. No. 11/873,407, Non-Final Office Action Nov. 13, 2009, 7 pages.
U.S. Appl. No. 11/873,407, Notice of Allowance mailed on Nov. 10, 2010, 14 pages.
U.S. Appl. No. 11/873,407, Notice of Allowance mailed on Mar. 7, 2011, 8 pages.
U.S. Appl. No. 11/874,197, Final Office Action mailed on mailed on Aug. 12, 2011, 26 pages.
U.S. Appl. No. 11/874,197, Final Office Action mailed on Jun. 29, 2010, 17 pages.
U.S. Appl. No. 11/874,197, Non-Final Office Action mailed on Dec. 22, 2010, 22 pages.

(56) References Cited

OTHER PUBLICATIONS

U.S. Appl. No. 11/874,197, Office Action mailed on Nov. 10, 2009, 14 pages.
U.S. Appl. No. 11/874,202, Final Office Action mailed on Jun. 8, 2010, 200 pages.
U.S. Appl. No. 11/874,202, Non-Final Office Action mailed on Dec. 3, 2009, 20 pages.
U.S. Appl. No. 11/874,202, Notice of Allowance mailed on Mar. 31, 2011, 12 pages.
U.S. Appl. No. 11/874,202, Notice of Allowance mailed on Dec. 22, 2010, 29 pages.
U.S. Appl. No. 11/874,850, Notice of Allowance mailed on Jan. 27, 2010, 11 pages.
U.S. Appl. No. 11/874,850, Notice of Allowance mailed on Nov. 24, 2009, 17 pages.
U.S. Appl. No. 11/874,850, Notice of Allowance mailed on Dec. 11, 2009, 5 pages.
U.S. Appl. No. 11/874,896, Final Office Action mailed on Jul. 23, 2010, 28 pages.
U.S. Appl. No. 11/874,896, Non-Final Office Action mailed on Dec. 8, 2009, 19 pages.
U.S. Appl. No. 11/874,896, Non-Final Office Action mailed on Nov. 22, 2010, 25 pages.
U.S. Appl. No. 11/874,896, Notice of Allowance mailed on Jun. 23, 2011, 30 pages.
U.S. Appl. No. 11/927,681, Non-Final Office Action mailed on Mar. 24, 2011, 17 pages.
U.S. Appl. No. 11/927,681, Notice of Allowance mailed on Jul. 1, 2011, 8 pages.
U.S. Appl. No. 11/927,683, Final Office Action mailed on Sep. 1, 2011, 18 pages.
U.S. Appl. No. 11/927,683, Non-Final Office Action mailed on Mar. 24, 2011, 13 pages.
U.S. Appl. No. 11/927,683, Notice of Allowance mailed on Nov. 9, 2011, 10 pages.
U.S. Appl. No. 11/977,437, Final Office Action mailed on Apr. 8, 2010, 18 pages.
U.S. Appl. No. 11/977,437, Non-Final Office Action mailed on Oct. 13, 2009, 9 pages.
U.S. Appl. No. 11/977,437, Notice of Allowance mailed on Mar. 4, 2013, 9 pages.
U.S. Appl. No. 11/977,437, Office Action mailed on Aug. 3, 2012, 17 pages.
U.S. Appl. No. 11/977,439, Non-Final Office Action mailed on Apr. 13, 2010, 7 pages.
U.S. Appl. No. 11/977,439, Notice of Allowance mailed on Mar. 16, 2011, 10 pages.
U.S. Appl. No. 11/977,439, Notice of Allowance mailed on Aug. 18, 2010, 11 pages.
U.S. Appl. No. 11/977,439, Notice of Allowance mailed on Sep. 28, 2010, 6 pages.
U.S. Appl. No. 11/977,439, Notice of Allowance mailed on Nov. 24, 2010, 8 pages.
U.S. Appl. No. 11/977,440, Notice of Allowance mailed on Oct. 7, 2009, 6 pages.
U.S. Appl. No. 12/193,377, Final Office Action mailed on Jan. 17, 2013, 24 pages.
U.S. Appl. No. 12/395,871, Non-Final Office Action mailed on May 27, 2011, 7 pages.
U.S. Appl. No. 12/395,871, Notice of Allowance mailed on Apr. 2012, 27 pages.
U.S. Appl. No. 12/395,871, Office Action mailed on Oct. 9, 2011, 33 pages.
U.S. Appl. No. 12/396,008, Non-Final Office Action mailed on Jun. 8, 2011, 10 pages.
U.S. Appl. No. 12/396,008, Notice of Allowance mailed on Nov. 16, 2011, 5 pages.
U.S. Appl. No. 12/396,464, Final Office Action mailed on Jan. 16, 2013, 17 pages.
U.S. Appl. No. 12/396,464, Non-Final Office Action mailed on Sep. 7, 2012, 18 pages.
U.S. Appl. No. 12/506,891, Notice of Allowance Jul. 25, 2012, 8 pages.
U.S. Appl. No. 12/506,891, Office Action mailed on Dec. 14, 2011, 41 pages.
U.S. Appl. No. 12/506,905, Notice of Allowance mailed on Dec. 14, 2012, 15 pages.
U.S. Appl. No. 12/506,905, Office Action mailed on Aug. 9, 2012, 42 pages.
U.S. Appl. No. 12/506,905, Office Action mailed on Mar. 26, 2012, 61 pages.
U.S. Appl. No. 12/534,384, Notice of Allowance mailed on May 7, 2013, 12 pages.
U.S. Appl. No. 12/534,384, Non-Final Office Action mailed on Feb. 28, 2012, 13 pages.
U.S. Appl. No. 12/534,384, Final Office Action mailed on Feb. 12, 2013, 14 pages.
U.S. Appl. No. 12/534,398, Final Office Action mailed on Jun. 5, 2012, 27 pages.
U.S. Appl. No. 12/534,398, Notice of Allowance mailed on Nov. 27, 2012, 10 pages.
U.S. Appl. No. 12/534,398, Non-Final Office Action mailed on Nov. 1, 2011, 15 pages.
U.S. Appl. No. 12/548,187, Non Final Office Action mailed on Sep. 27, 2011, 19 pages.
U.S. Appl. No. 12/548,187, Non-Final Office Action mailed on Apr. 9, 2013, 17 pages.
U.S. Appl. No. 12/548,187, Final Office Action mailed on Jun. 20, 2012, 22 pages.
U.S. Appl. No. 12/548,209, Notice of Allowance mailed on Oct. 24, 2012, 22 pages.
U.S. Appl. No. 12/548,209, Office Action mailed on Apr. 16, 2012, 40 pages.
U.S. Appl. No. 12/548,222, Non-Final Office Action mailed on Apr. 10, 2013, 16 pages.
U.S. Appl. No. 12/548,222, Non-Final Office Action mailed on Oct. 19, 2011, 19 pages.
U.S. Appl. No. 12/548,222, Office Action mailed on Jun. 20, 2012, 29 pages.
U.S. Appl. No. 12/548,281, Non-Final Office Action mailed on Apr. 12, 2013, 16 pages.
U.S. Appl. No. 12/548,281, Non-Final Office Action mailed on Oct. 3, 2011, 20 pages.
U.S. Appl. No. 12/548,281, Office Action mailed on Jun. 20, 2012, 29 pages.
U.S. Appl. No. 12/548,290, Final Office Action mailed on Jul. 30, 2012, 34 pages.
U.S. Appl. No. 12/548,290, Non-Final Office Action mailed on Oct. 3, 2011, 17 pages.
U.S. Appl. No. 12/548,290, Non-Final Office Action mailed on Apr. 15, 2013, 17 pages.
U.S. Appl. No. 12/874,197, Notice of Allowance mailed on Jun. 22, 2012.
U.S. Appl. No. 12/913,636, Final Office Action mailed on Jan. 8, 2013, 21 pages.
U.S. Appl. No. 12/913,636, Non-Final Office Action mailed on Jun. 7, 2012, 16 pages.
U.S. Appl. No. 12/949,081, Non-Final Office Action mailed on Jan. 9, 2013, 12 pages.
U.S. Appl. No. 12/957,194, Non-Final Office Action mailed on Dec. 7, 2012, 11 pages.
U.S. Appl. No. 12/957,194, Notice of Allowance mailed on Mar. 20, 2013, 9 pages.
U.S. Appl. No. 12/957,201, Final Office Action mailed on Apr. 25, 2013, 11 pages.
U.S. Appl. No. 12/957,201, Office Action mailed on Dec. 19, 2012, 15 pages.
U.S. Appl. No. 13/089,556, Non-Final Office Action mailed on Apr. 10, 2013, 10 pages.
U.S. Appl. No. 13/089,556, Office Action mailed on Nov. 6, 2012, 13 pages.

(56) References Cited

OTHER PUBLICATIONS

U.S. Appl. No. 13/102,665, Office Action mailed on Feb. 1, 2013, 14 pages.
U.S. Appl. No. 13/107,742, Non-Final Office Action mailed on Feb. 14, 2013, 16 pages.
U.S. Appl. No. 13/184,528, Notice of Allowance mailed on Mar. 1, 2012.
U.S. Appl. No. 13/193,377, Office Action mailed on Jan. 17, 2013, 25 pages.
U.S. Appl. No. 13/193,377, Office Action mailed on Aug. 23, 2012, 48 pages.
U.S. Appl. No. 13/244,272, Final Office Action mailed on Mar. 28, 2013, 29 pages.
U.S. Appl. No. 13/244,272, Non-Final Office Action mailed on Oct. 4, 2012, 30 pages.
U.S. Appl. No. 13/396,464, Office Action mailed on Sep. 7, 2012.
Abadi, et al., Aurora: A Data Stream Management System, International Conference on Management of Data, Proceedings of the 2003 ACM SIGMOD International Conference on Management of Data, 2003, 4 pages.
Aho, et al., Efficient String Matching: An Aid to Bibliographic Search, Communications of the ACM, vol. 18, No. 6, Association for Computing Machinery, Inc., Jun. 1975, pp. 333-340.
Arasu, et al., An Abstract Semantics and Concrete Language for Continuous Queries over Streams and Relations, 9th International Workshop on Database programming languages, Sep. 2003, 11 pages.
Arasu, et al., An Abstract Semantics and Concrete Language for Continuous Queries over Streams and Relations, 9th International Workshop on Database programming languages, Sep. 2003, 12 pages.
Arasu, et al., CQL: A language for Continuous Queries over Streams and Relations, Lecture Notes in Computer Science vol. 2921, 2004, pp. 1-19.
Arasu, et al., STREAM: The Stanford Data Stream Management System, Department of Computer Science, Stanford University, 2004, p. 21.
Arasu, et al., The CQL Continuous Query Language: Semantic Foundations and Query Execution, Stanford University, The VLDB Journal—The International Journal on Very Large Data Bases, vol. 15, No. 2, Springer-Verlag New York, Inc., Jun. 2006, pp. 1-32.
Avnur, et al., Eddies: Continuously Adaptive Query Processing, In Proceedings of the 2000 ACM SIGMOD International Conference on Data, Dallas TX, May 2000, 12 pages.
Avnur, et al., Eddies: Continuously Adaptive Query Processing, slide show, believed to be prior to Oct. 17, 2007, 4 pages.
Babcock et al., Models and Issues in Data Streams, Proceedings of the 21st ACM SIGMOD-SIGACT-SIDART symposium on Principles of database systems, 2002, 30 pages.
Babu, et al., Continuous Queries over Data Streams, SIGMOD Record, vol. 30, No. 3, Sep. 2001, pp. 109-120.
Bai, et al., A Data Stream Language and System Designed for Power and Extensibility, Conference on Information and Knowledge Management, Proceedings of the 15th ACM D International Conference on Information and Knowledge Management, Arlington, Virginia, Copyright 2006, ACM Press., Conference on Information and Knowledge Management, Proceedings of the 15th ACM D International Conference on Information and Knowledge Management, Arlington, Virginia, Copyright 2006, ACM Press., Nov. 5-11, 2006, 10 pages.
Bose, et al., A Query Algebra for Fragmented XML Stream Data, 9th International Conference on Data Base Programming Languages (DBPL), Sep. 2003, 11 pages.
Buza, Extension of CQL over Dynamic Databases, Journal of Universal Computer Science, vol. 12, No. 9, Sep. 28, 2006, pp. 1165-1176.
Carpenter, User Defined Functions, Retrieved from: URL: http://www.sqlteam.comitemprint.asp?ItemID=979, Oct. 12, 2000, 4 pages.
Chan, et al., Efficient Filtering of XML documents with Xpath expressions, VLDB Journal D, 2002, pp. 354-379.
Chandrasekaran, et al., TelegraphCQ: Continuous Dataflow Processing for an Uncertain World, Proceedings of CIDR, 2003, 12 pages.
Chen, et al., NiagaraCQ: A Scalable Continuous Query System for Internet Databases, Proceedings of the 2000 SIGMOD International Conference on Management of Data., May 2000, 379-390 pages.
Colyer, et al., Spring Dynamic Modules Reference Guide, Copyright, ver. 1.0.3, 2006-2008, 73 pages.
Colyer, et al., Spring Dynamic Modules Reference Guide, Ver. 1.1.3, 2006-2008, 96 pages.
Conway, An Introduction to Data Stream Query Processing, Truviso, Inc., URL: http://neilconway.org/talks/streamjntro.pdf, May 24, 2007, 71 pages.
Demers, et al., Towards Expressive Publish/Subscribe Systems, Proceedings of the 10th International Conference on Extending Database Technology (EDBT 2006),Munich, Germany, Mar. 2006, pp. 1-18.
Demichiel, et al., JSR 220: Enterprise JavaBeans™, EJB 3.0 Simplified API, EJB 3.0 Expert Group, Sun Microsystems, Ver. 3.0, May 2, 2006, 59 pages.
Deshpande, et al., Adaptive Query Processing, Slide show believed to be prior to Oct. 17, 2007, 27 pages.
Diao, et al., Query Processing for High-Volume XML Message Brokering, Proceedings of the 29th VLDB Conference, Berlin, Germany, 2003, 12 pages.
Diao, Query Processing for Large-Scale XML Message Brokering, University of California Berkeley, 2005, 226 pages.
Dindar, et al., Event Processing Support for Cross-Reality Environments, Pervasive Computing, IEEE CS, Jul.-Sep. 2009, Copyright 2009, IEEE, Jul.-Sep. 2009, pp. 2-9.
Fernandez, et al., Build your own XQuery processor, slide show, at URL: http://www.galaxyquery.org/slides/edbt-summer-school2004.pdf, 2004, 116 pages.
Fernandez, et al., Implementing XQuery 1.0: The Galax Experience, Proceedings of the 29th VLDB Conference, Berlin, Germany, 2003, 4 pages.
Florescu, et al., The BEA/XQRL Streaming XQuery Processor, Proceedings of the 29th VLDB Conference, 2003, 12 pages.
Gilani, Design and implementation of stream operators, query instantiator and stream buffer manager, Dec. 2003, 137 pages.
Golab, et al., Issues in Data Stream Management, ACM SIGMOD Record, vol. 32, issue 2, ACM Press, Jun. 2003, pp. 5-14.
Golab, et al., Sliding Window Query Processing Over Data Streams, University of Waterloo, D Waterloo, Ont. Canada, Aug. 2006, 182 pages.
Gosling, et al., The Java Language Specification, Book, copyright , 3rd edition, FG , Sun Microsystems USA. D (due to size, reference will be uploaded in two parts), 1996-2005, 684 pages.
Hao, et al., Achieving high performance web applications by service and database replications at edge servers, Performance Computing and communications conference(IPCCC) IEEE 28th International, IEEE, Piscataway, NJ, USA, XP031622711, ISBN: 978-1-4244-5737-3, 2009, pp. 153-160.
Hopcroft, Introduction to Automata Theory, Languages, and Computation, Second Edition, Addison-Wesley, Copyright 2001, 524 pages.
Hulton, et al., Mining Time-Changing Data Stream, Proceedings of the Seventh ACM SIGKDD International Conference on Knowledge Discovery and Data Mining, Aug. 2001, 10 pages.
Jin, et al., ARGUS: Efficient Scalable Continuous Query Optimization for Large-Volume Data Streams, 10th International Database Engineering and Applications Symposium (IDEAS'06), 2006, 7 pages.
Kawaguchi, et al., Java Architecture for XML Binding (JAXB) 2.2, Sun Microsystems, Inc., Dec. 10, 1999, 384 pages.
Knuth, et al., Fast Pattern Matching in Strings, Siam J Comput 6(2), Jun. 1977, 323-50 pages.
Lakshmanan, et al., On efficient matching of streaming XML documents and queries, 2002, 18 pages.
Lindholm, et al., Java Virtual Machine Specification, 2nd Edition Prentice Hall, Apr. 1999, 484 pages.

(56) References Cited

OTHER PUBLICATIONS

Liu, et al., Efficient XSLT Processing in Relational Database System, Proceeding of the 32nd. International Conference on Very Large Data Bases (VLDB), Sep. 2006, pp. 1106-1116.

Luckham, What's the Difference Between ESP and CEP? Complex Event Processing, downloaded, at URL:http://complexevents.com/?p=103, Apr. 29, 2011, 5 pages.

Madden, et al., Continuously Adaptive Continuous Queries (CACQ) over Streams, SIGMOD, Jun. 4-6, 2002, 12 pages.

Martin, et al., Finding Application Errors and Security Flaws Using PQL, a Program Query Language, OOPSLA'05, Oct. 16, 2005, pp. 1-19.

Motwani, et al., Query Processing Resource Management, and Approximation in a Data 0 Stream Management System, Proceedings of CIDR, Jan. 2003, 12 pages.

Munagala, et al., Optimization of Continuous Queries with Shared Expensive Filters, Proceedings of the 26th ACM SIGMOD-SIGACT-SIGART symposium on Principles of database systems, Oct. 17, 2007, 14 pages.

Nah, et al., A Cluster-Based TMO-Structured Scalable Approach for Location Information Systems, Object-Oriented Real-Time Dependable Systems, 2003. Words 2003 Fall. Proceedings. Ninth IEEE International Workshop on Date of Conference: Oct. 1-3, 2003, pp. 225-233.

Novick, Creating a User Defined Aggregate with SQL Server 2005, URL: http://novicksoftware.com/Articles/sql-2005-product-user-defined-aggregate.html, 2005, 6 pages.

International Application No. PCT/US2011/052019, International Search Report and Written Opinion mailed on Nov. 17, 2011, 55 pages.

International Application No. PCT/US2012/034970, International Search Report and Written Opinion mailed on Jul. 16, 2012, 13 pages.

International Application No. PCT/US2012/036353, International Search Report and Written Opinion mailed on Sep. 12, 2012, 11 pages.

Peng, et al., Xpath Queries on Streaming Data, 2003, pp. 1-12.

Peterson, Petri Net Theory and the Modeling of Systems, Prentice Hall, 1981, 301 pages.

PostgresSQL, Manuals: PostgresSQL 8.2: Create Aggregate, believed to be prior to Apr. 21, 2007, 4 pages.

PostgresSQL, Documentation: Manuals: PostgresSQL 8.2: User-Defined Aggregates believed to be prior to Apr. 21, 2007, 4 pages.

Sadri, et al., Expressing and Optimizing Sequence Queries in Database Systems, ACM Transactions on Database Systems, vol. 29, No. 2, ACM Press, Copyright, Jun. 2004, 282-318 pages.

Sadtler, et al., WebSphere Application Server Installation Problem Determination, Copyright 2007, IBM Corp., 2007, 1-48 pages.

Sansoterra, Empower SQL with Java User-Defined Functions, ITJungle.com, Oct. 9, 2003, 9 pages.

Sharaf, et al., Efficient Scheduling of Heterogeneous Continuous Queries, VLDB, Sep. 12-15, 2006, 511-522 pages.

Stolze, et al., User-defined Aggregate Functions in DB2 Universal Database, Retrievd from: <http://www.128.ibm.com/deve10perworks/d b2/1 ibrary/tachartic1e/0309stolze/0309stolze.html>, Sep. 11, 2003, 11 pages.

Stump, et al., Proceedings, The 2006 Federated Logic Conference, IJCAR '06 Workshop, PLPV '06: Programming Languages meets Program Verification, 2006, 1-113 pages.

Terry, et al., Continuous queries over append-only database, Proceedings of ACM SIGMOD, 1992, 321-330 pages.

Ullman, et al., Introduction to JDBC, Stanford University, 2005, 7 pages.

Vajjhala, et al., The Java Architecture for XML Binding (JAXB) 2.0, Sun Microsystem, D Inc., Final Release, Apr. 19, 2006, 384 pages.

Vijayalakshmi, et al., Processing location dependent continuous queries in distributed mobile databases using mobile agents, IET-UK International Conference on Information and Communication Technology in Electrical Sciences (ICTES 2007), Dec. 22, 2007, 1023-1030 pages.

W3C, XML Path Language (Xpath), W3C Recommendation, Version. 1.0, Retrieved from: URL: http://www.w3.org/TR/xpath, Nov. 16, 1999, 37 pages.

Wang, et al., Distributed continuous range query processing on moving objects, DEXA'06 Proceedings of the 17th international conference on Database and Expert Systems Applications, 2006, 655-665 pages.

White, et al., WebLogic Event Server: A Lightweight, Modular Application Server for Event Processing, 2nd International Conference on Distributed Event-Based Systems, Rome, Italy, Copyright 2004., Jul. 2-4, 2008, 8 pages.

Widom, et al., CQL: A Language for Continuous Queries over Streams and Relations, Oct. 17, 2007, 62 pages.

Widom, et al., The Stanford Data Stream Management System, PowerPoint Presentation, Oct. 17, 2007, 110 pages.

Wu, et al., Dynamic Data Management for Location Based Services in Mobile Environments, Database Engineering and Applications Symposium, Jul. 16, 2003, 172-181 pages.

Zemke, XML Query, mailed on Mar. 14, 2004, 29 pages.

Pattern Recognition With MATCH_RECOGNIZE, Oracle™ Complex Event Processing CQL Language Reference, 11g Release 1 (11.1.1) E12048-03, May 2009, pp. 15.1 to 15.20.

U.S. Appl. No. 11/977,437, Notice of Allowance mailed on Jul. 10, 2013, 10 pages.

U.S. Appl. No. 11/601,415, Non-Final Office Action mailed on Dec. 11, 2013, 58 pages.

U.S. Appl. No. 12/396,464, Non Final Office Action mailed on Dec. 31, 2013, 16 pages.

U.S. Appl. No. 12/548,187, Final Office Action mailed on Jun. 10, 2013, 18 pages.

U.S. Appl. No. 12/548,222, Notice of Allowance mailed on Jul. 18, 2013, 12 pages.

U.S. Appl. No. 12/548,281, Final Office Action mailed on Oct. 10, 2013, 21 pages.

U.S. Appl. No. 12/548,290, Notice of Allowance mailed on Sep. 11, 2013, 6 pages.

U.S. Appl. No. 12/949,081, Final Office Action mailed on Aug. 27, 2013, 13 pages.

U.S. Appl. No. 13/089,556, Final Office Action mailed on Aug. 29, 2013, 10 pages.

U.S. Appl. No. 13/089,556, Non-Final Office Action mailed on Jan. 9, 2014, 14 pages.

U.S. Appl. No. 13/102,665, Final Office Action mailed on Jul. 9, 2013, 17 pages.

U.S. Appl. No. 13/107,742, Final Office Action mailed on Jul. 3, 2013, 19 pages.

U.S. Appl. No. 13/177,748, Non-Final Office Action mailed on Aug. 30, 2013, 24 pages.

U.S. Appl. No. 13/193,377, Notice of Allowance mailed on Aug. 30, 2013, 19 pages.

Non-Final Office Action for U.S. Appl. No. 12/548,187 dated Feb. 6, 2014, 53 pages.

Agrawal et al. "Efficient pattern matching over event streams," Proceedings of the 2008 ACM SIGMOD international conference on Management of data, pp. 147-160 (Jun. 2008).

Chandramouli et al., High-Performance Dynamic Pattern Matching over Disordered Streams, Proceedings of the VLDB Endowment, vol. 3 Issue 1-2, Sep. 2010, pp. 220-231.

Chapple "Combining Query Results with the UNION Command," ask.com Computing Databases, downloaded from: http://databases.about.com/od/sql/a/union.htm (no date, printed on Oct. 14, 2013).

Chui, WebSphere Application Server V6.1—Class loader problem determination, IBM.com, copyright 2007, 66 pages.

Komazec et al., Towards Efficient Schema-Enhanced Pattern Matching over RDF Data Streams, Proceedings of the 1st International Workshop on Ordering and Reasoning (OrdRing 2011), Bonn, Germany, Oct. 2011.

Ogrodnek, Custom UDFs and hive, Bizo development blog http://dev.bizo.com, Jun. 23, 2009, 2 pages.

Bottom-up parsing, Wikipedia, downloaded from: http://en.wikipedia.org/wiki/Bottom-up_parsing, Sep. 8, 2014, pp. 1-2.

Branch Predication, Wikipedia, downloaded from: http://en.wikipedia.org/wiki/Branch_predication, Sep. 8, 2014, pp. 1-4.

(56) References Cited

OTHER PUBLICATIONS

Microsoft Computer Dictionary, 5th Edition, Microsoft Press, Redmond, WA, ©, 2002, pp. 238-239 and 529.
Notice of Allowance for U.S. Appl. No. 13/089,556 dated Oct. 6, 2014, 9 pages.
U.S. Appl. No. 12/396,464, Notice of Allowance mailed on Sep. 3, 2014, 7 pages.
U.S. Appl. No. 12/548,187, Advisory Action mailed on Sep. 26, 2014, 6 pages.
U.S. Appl. No. 12/548,281, Final Office Action mailed on Aug. 13, 2014, 19 pages.
U.S. Appl. No. 12/913,636, Non-Final Office Action mailed on Jul. 24, 2014, 22 pages.
U.S. Appl. No. 12/957,201, Non-Final Office Action mailed on Jul. 30, 2014, 12 pages.
U.S. Appl. No. 13/764,560, Non Final Office Action mailed on Sep. 12, 2014, 23 pages.
U.S. Appl. No. 13/770,969, Non Final Office Action mailed on Aug. 7, 2014, 9 pages.
U.S. Appl. No. 14/302,031, Non-Final Office Action mailed on Aug. 27, 2014, 19 pages.
Abadi et al., Aurora: a new model and architecture for data stream management, the VLDB Journal the International Journal on very large data bases, vol. 12, No. 2, Aug. 1, 2003, pp. 120-139.
Balkesen et al., Scalable Data Partitioning Techniques for Parallel Sliding Window Processing over Data Streams, 8th International Workshop on Data Management for Sensor Networks, Aug. 29, 2011, pp. 1-6.
Chandrasekaran et al., PSoup: a system for streaming queries over streaming data, the VLDB Journal the International Journal on very large data bases, vol. 12, No. 2, Aug. 1, 2003, pp. 140-156.
Dewson, Beginning SQL Server 2008 for Developers: From Novice to Professional, A Press, Berkeley, CA, 2008, pp. 337-349 and 418-438.
Harish et al., Identifying robust plans through plan diagram reduction, PVLDB '08, Auckland, New Zealand, Aug. 23-28, 2008, pp. 1124-1140.
Krämer, Continuous Queries Over Data Streams—Semantics and Implementation, Fachbereich Mathematik and Informatik der Philipps-Universitat, Marburg, Germany, Retrieved from the Internet: URL:http://archiv.ub.uni-marburg.de/dissjz007/0671/pdfjdjk.pdf, Jan. 1, 2007; 313 pages.
International Application No. PCT/US2013/062047, International Search Report and Written Opinion mailed Jul. 16, 2014, 12 pages.
International Application No. PCT/US2013/062050, International Search Report & Written Opinion mailed on Jul. 2, 2014, 13 pages.
International Application No. PCT/US2013/062052, International Search Report & Written Opinion mailed on Jul. 3, 2014, 12 pages.
International Application No. PCT/US2013/073086, International Search Report and Written Opinion mailed on Mar. 14, 2014.
International Application No. PCT/US2014/017061, International Search Report and Written Opinion mailed on Sep. 9, 2014, 12 pages.
Rao et al., Compiled Query Execution Engine using JVM, ICDE '06, Atlanta, GA, Apr. 3-7, 2006, 12 pages.
Ray et al., Optimizing complex sequence pattern extraction using caching, data engineering workshops (ICDEW)~ 2011 IEEE 27th international conference on IEEE, Apr. 11, 2011, pp. 243-248.
Shah et al., Flux: an adaptive partitioning operator for continuous query systems, Proceedings of the 19th International Conference on Data Engineering, Mar. 5-8, 2003, pp. 25-36.
Stillger et al., LEO—DB2's LEarning Optimizer, Proc. of the VLDB, Roma, Italy, Sep. 2001, pp. 19-28.
U.S. Appl. No. 12/548,281, Non-Final Office Action mailed on Feb. 13, 2014, 16 pages.
U.S. Appl. No. 13/177,748, Final Office Action mailed on Mar. 20, 2014, 23 pages.
PCT Patent Application No. PCT/US2014/010832, International Search Report mailed on Apr. 3, 2014, 9 pages.
Cadonna et al., Efficient event pattern matching with match windows, Proceedings of the 18th ACM SIGKDD international conference on knowledge discovery and data mining (Aug. 2012), pp. 471-479.
Nichols et al., A faster closure algorithm for pattern matching in partial-order event data, IEEE International Conference on Parallel and Distributed Systems (Dec. 2007), pp. 1-9.
"Strings in C," Swarthmore College, retrieved from internet: http://web.cs.swarthmore.edu/~newhall/unixhelp/C_strings.html (Jun. 12, 2007) 3 pages.
"Call User Defined Functions from Pig," Amazon Elastic MapReduce Developer Guide (Mar. 2009) 2 pages.
U.S. Appl. No. 11/874,197, Notice of Allowance mailed on Jun. 22, 2012, 20 pages.
U.S. Appl. No. 12/396,464, Final Office Action mailed on May 16, 2014, 16 pages.
U.S. Appl. No. 13/107,742, Non-Final Office Action mailed on Jun. 19, 2014, 20 pages.
U.S. Appl. No. 12/548,187, Non-Final Office Action mailed on Jun. 4, 2014, 64 pages.
U.S. Appl. No. 13/089,556, Final Office Action mailed on Jun. 13, 2014, 14 pages.
U.S. Appl. No. 13/244,272, Notice of Allowance mailed on Aug. 12, 2013, 12 pages.
International Application No. PCT/US2011/052019, International Preliminary Report on Patentability mailed on Mar. 28, 2013, 6 pages.
International Application No. PCT/US2012/034970, International Preliminary Report on Patentability mailed on Nov. 21, 2013, 7 pages.
International Application No. PCT/US2012/036353, International Preliminary Report on Patentability mailed on Nov. 28, 2013, 6 pages.
International Search Report and Written Opinion dated Dec. 15, 2014 for PCT/US2014/010920, 10 pages.
Babu et al., "Exploiting k-Constraints to Reduce Memory Overhead in Continuous Queries Over Data Streams", ACM Transactions on Database Systems (TODS) vol. 29 Issue 3, Sep. 2004, 36 pages.
Tho et al. "Zero-latency data warehousing for heterogeneous data sources and continuous data streams," 5th International Conference on Information Integrationand Web-based Applications Services (Sep. 2003) 12 pages.
"SQL Subqueries"—Dec. 3, 2011, 2 pages.
"Caching Data with SqiDataSource Control"—Jul. 4, 2011, 3 pages.
"SCD—Slowing Changing Dimensions in a Data Warehouse"—Aug. 7, 2011, one page.
Non-Final Office Action for U.S. Appl. No. 13/838,259 dated Oct. 24, 2014, 21 pages.
Notice of Allowance for U.S. Appl. No. 13/102,665 dated Nov. 24, 2014, 9 pages.
Non-Final Office Action for U.S. Appl. No. 13/827,631 dated Nov. 13, 2014, 10 pages.
Non-Final Office Action for U.S. Appl. No. 13/827,987 dated Nov. 6, 2014, 9 pages.
Non-Final Office Action for U.S. Appl. No. 11/601,415 dated Oct. 6, 2014, 18 pages.
Non-Final Office Action for U.S. Appl. No. 14/077,230 dated Dec. 4, 2014, 30 pages.
Non-Final Office Action for U.S. Appl. No. 13/828,640 dated Dec. 2, 2014, 11 pages.
Non-Final Office Action for U.S. Appl. No. 13/830,428 dated Dec. 5, 2014, 23 pages.
Non-Final Office Action for U.S. Appl. No. 13/830,502 dated Nov. 20, 2014, 25 pages.
Non-Final Office Action for U.S. Appl. No. 13/839,288 dated Dec. 4, 2014, 30 pages.
U.S. Appl. No. 12/949,081, Non-Final Office Action mailed on Jan. 28, 2015, 20 pages.
U.S. Appl. No. 12/957,201, Notice of Allowance mailed on Jan. 21, 2015, 5 pages.
U.S. Appl. No. 13/107,742, Final Office Action mailed on Jan. 21, 2015, 23 pages.
U.S. Appl. No. 13/177,748, Non-Final Office Action mailed on Feb. 3, 2015, 22 pages.

(56) References Cited

OTHER PUBLICATIONS

U.S. Appl. No. 13/770,961, Non-Final Office Action mailed on Feb. 4, 2015, 22 pages.
U.S. Appl. No. 13/770,969, Notice of Allowance mailed on Jan. 22, 2015, 5 pages.
U.S. Appl. No. 13/829,958, Non-Final Office Action mailed on Dec. 11, 2014, 15 pages.
U.S. Appl. No. 13/906,162, Non-Final Office Action mailed on Dec. 29, 2014, 10 pages.
International Application No. PCT/US2014/010832, Written Opinion mailed on Dec. 15, 2014, 5 pages.
International Application No. PCT/US2014/017061, Written Opinion mailed on Feb. 3, 2015, 6 pages.
International Application No. PCT/US2014/039771, International Search Report and Written Opinion mailed on Sep. 24, 2014, 12 pages.
Non-Final Office Action for U.S. Appl. No. 13/830,378 dated Feb. 25, 2015, 23 pages.
Non-Final Office Action for U.S. Appl. No. 13/830,129 dated Feb. 27, 2015, 19 pages.
International Application No. PCT/US2014/068641, International Search Report and Written Opinion mailed on Feb. 26, 2015, 11 pages.
Cranor et al. "Gigascope: a stream database for network applications," Proceedings of the 2003 ACM SIGMOD international conference on management of data, pp. 647-651 (Jun. 2003).
Non-Final Office Action for U.S. Appl. No. 12/913,636 dated Apr. 1, 2015, 22 pages.
Final Office Action for U.S. Appl. No. 13/827,631 dated Apr. 3, 2015, 11 pages.
Notice of Allowance for U.S. Appl. No. 13/839,288 dated Apr. 3, 2015, 12 pages.
Notice of Allowance for U.S. Appl. No. 14/077,230 dated Apr. 16, 2015, 16 pages.
Final Office Action for U.S. Appl. No. 13/764,560 dated Apr. 15, 2015, 19 pages.
European Patent Application No. 12783063.6, Extended Search Report mailed Mar. 24, 2015, 6 pages.
Oracle® Complex Event Processing EPL Language Reference 11g Release 1 (11.1.1.4.0), E14304-02, Jan. 2011, 80 pages.
De Castro Alves, A General Extension System for Event Processing Languages, DEBS '11, New York, NY, USA, Jul. 11-15, 2011, pp. 1-9.
Takenaka et al., A scalable complex event processing framework for combination of SQL-based continuous queries and C/C++ functions, FPL 2012, Oslo, Norway, Aug. 29-31, 2012, pp. 237-242.
Tomás et al., RoSeS: A Continuous Content-Based Query Engine for RSS Feeds, DEXA 2011, Toulouse, France, Sep. 2, 2011, pp. 203-218.

\* cited by examiner

VARIABLE DURATION NON-EVENT PATTERN MATCHING

CROSS-REFERENCES TO RELATED APPLICATIONS

The present application is a non-provisional of and claims the benefit and priority under 35 U.S.C. 119(e) of U.S. Provisional Application No. 61/752,855 filed Jan. 15, 2013, entitled VARIABLE DURATION NON EVENT PATTERN MATCHING, the entire contents of which are incorporated herein by reference for all purposes.

BACKGROUND

The disclosed embodiments relate generally to data processing systems, and more specifically to techniques for performing non-event pattern matching on continuous event streams using variable duration functionality.

In traditional database systems, data is stored in one or more databases usually in the form of tables. The stored data is then queried and manipulated using a data management language such as SQL. For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), click-stream analysis tools, automobile traffic monitoring, and the like. For example, a temperature sensor may be configured to send out temperature readings. Such applications have given rise to a need for a new breed of applications that can process the data streams.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's events processing needs.

BRIEF SUMMARY

Certain embodiments are disclosed for performing non-event pattern matching on continuous event streams using variable duration.

In the context of pattern matching functionality of an event-processing engine, non-event detection refers to the detection of a situation when a certain event, which should have occurred in a particular time frame, does not occur in that time frame. For example, in a scenario when events occur in a specific order, non-event detection can be used to detect the situation where a particular event which is supposed to occur next in that order in a particular timeframe does not happen within that timeframe.

In non-events-based pattern matching, the arrival of an event may cause a pattern match candidate (sometimes referred to as a binding) to be started. A time duration is calculated and associated with the newly created binding, where the duration identifies a period after which the binding expires. In the context of non-event pattern matching, this duration may, for example, identify the timeframe in which the expected next event is supposed to occur. Certain embodiments of the present invention allow this duration to be variable for different bindings.

For example, a first event received via an event stream may cause a first pattern match candidate (i.e., a first binding) to be started. A second event received via the same event stream may cause a second pattern match candidate (i.e., a second binding) to be started. According to an embodiment of the present invention, the duration for the first binding can be different from the duration for the second binding. In this manner, different bindings used in the context of non-event pattern matching may have different or variable durations associated with them.

In certain embodiments, the duration for a binding may be based upon a value of an attribute of the event that starts the binding. For example, the duration may be expressed by a mathematical expression, where the expression is based upon one or more event attribute values of the event that causes the binding to be started. Since the values of the attribute can be different for different events, the duration calculated for bindings started by the different events may be different. This provides greater flexibility in performing non-event pattern matching and enables the processing to be applied to several real life scenarios, which was not possible in the past where all bindings had a fixed or constant duration.

In certain embodiments, a first event and a second event maybe received via an event stream. The first event may cause a first pattern match candidate to be started for a pattern. The second event may cause a second pattern match candidate to be started for the pattern. A first duration may be computed for the first pattern match candidate and a second duration may be computed for the second pattern match candidate, where the second duration is different from the first duration. In this manner, different events may have different duration associated with them.

In certain embodiment, the durations for the pattern matches starting at the first and second events may be computed based upon the value of an attribute of the events. For example, a first value of a first attribute of the first event may be determined and a second value of the first attribute of the second event may be determined, where the second value is different from the first value. The first value may then be used to compute the duration for the pattern match that started due to the first event and the second value may be used to compute the duration for the pattern match that started from the second event.

In certain embodiments, the durations for the pattern matches starting at the first and second events may be computed based upon evaluation of an expression (e.g., an arithmetic expression). For example, a first value of a first attribute of the first event may be determined and a second value of the first attribute of the second event may be determined, where the second value is different from the first value. An arithmetic expression may then be evaluated using the first value to compute the duration for the pattern match resulting from the first event and the arithmetic expression may be evaluated using the second value to compute the second duration for the pattern match resulting from the second event.

In certain embodiments, after the first time duration for the first pattern match candidate has passed, it may be determined whether the first pattern match candidate has matched the pattern. Upon determining that the first pattern match candidate has matched the pattern, information may be output indicative of a non-event occurrence corresponding to the first pattern match candidate.

In certain embodiments, an expiration time may be determined for the first pattern match candidate based upon an event timestamp associated with the first event and the first computed duration. This expiration time may then be associated with the first pattern match candidate. An expiration time may be determined for the second pattern match candidate based upon an event timestamp associated with the second event and the second computed duration. This expiration time may then be associated with the second pattern match candidate. In one embodiment, the expiration time for a pattern match candidate is determined by adding the duration computed for the pattern match candidate to the event timestamp associated with the event that started the pattern match candidate.

In certain embodiments, after an expirations time has been determined and associated with a pattern match candidate, a determination may be made, at or after the expiration time associated with the pattern match candidate, whether the pattern match candidate has matched the pattern. Upon determining that the pattern match candidate has matched the pattern, information may be output indicative of a non-event occurrence corresponding to the pattern match candidate.

DETAILED DESCRIPTION

Figure 1:
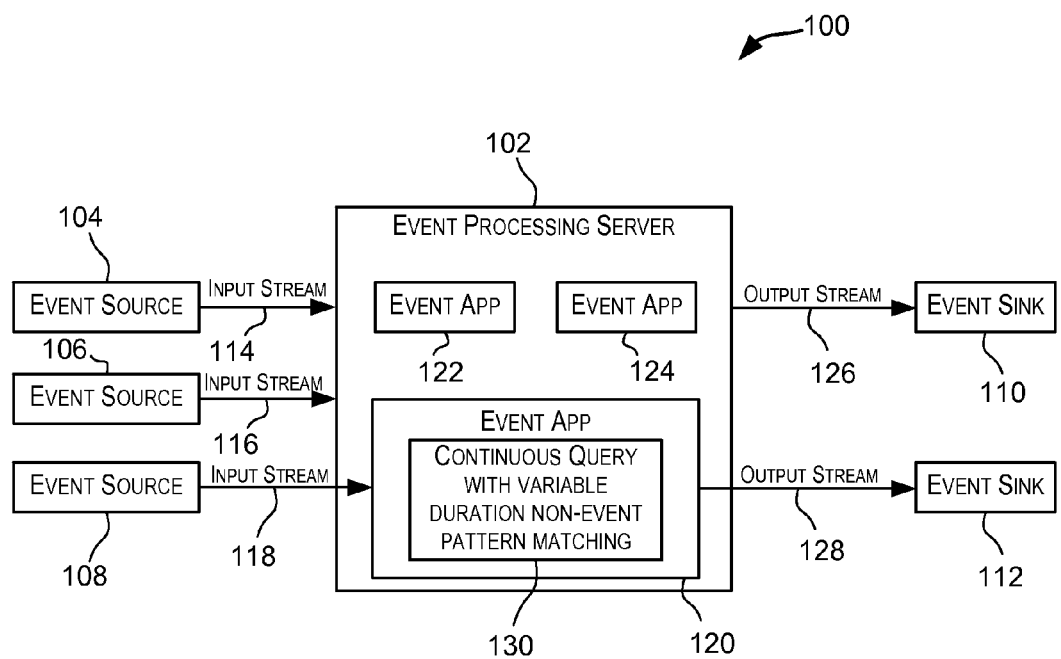
FIG. 1 depicts a simplified high level diagram of an event processing system that may incorporate an embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Certain embodiments are disclosed for performing non-event pattern matching on continuous event streams using variable durations.

In the context of pattern matching functionality of an event-processing engine, non-event detection refers to the detection of a situation when a certain event, which should have occurred in a particular time frame, does not occur in that time frame. For example, in a scenario when events occur in a specific order, non-event detection can be used to detect the situation where a particular event which is supposed to occur next in that order in a particular timeframe does not happen within that timeframe.

In events-based pattern matching, the arrival of an event may cause a pattern match candidate (sometimes referred to as a binding) to be started. A time duration is calculated and associated with the newly created binding, where the time duration identifies a period of time after which the binding expires. In the context of non-event pattern matching, this duration may, for example, identify the timeframe in which the expected next event is supposed to occur.

In the past, the duration associated with each binding starting due to a pattern match was always constant or fixed. For example, the DURATION clause, which is used to specify the duration for a binding could only take a constant or fixed value as a parameter, for example, "DURATION 10". With such a clause, every time a new pattern match binding starts, the duration for the binding was always set to 10 time units (10 seconds) and was the same for all bindings. This greatly limited the ability to use non-event pattern matching to model real life situations.

Certain embodiments of the present invention provide the desired flexibility allowing the duration associated with a binding to be variable for different bindings. For example, a first event received via an event stream may cause a first pattern match candidate (i.e., a first binding) to be started and a second event received via the same event stream may cause a second pattern match candidate (i.e., a second binding) to be started. According to certain embodiments of the present invention, the duration for the first binding can be different from the duration for the second binding. In this manner, the duration for one binding can vary from the duration for another binding. Different bindings used in the context of non-event pattern matching may thus have different or variable durations associated with them.

In certain embodiments, the duration for a binding may be based upon a value of an attribute of the event that starts the binding. For example, the duration may be expressed by a mathematical expression, where the expression is based upon one or more event attribute values of the event that causes the binding to be started. Since the values of the attribute can be different for different events, the duration calculated for bindings started by the different events may be different. This provides greater flexibility in performing non-event pattern matching and enables the processing to be applied to several real life scenarios, which was not possible in the past where all bindings had a fixed or constant duration.

As described above, embodiments of the present invention may be applied to the processing of event streams (also referred to continuous data streams). A continuous data stream or an event stream is a stream of data or events that may be continuous or unbounded in nature with no explicit end. Logically, an event or data stream is a sequence of data elements (also referred to as events), each data element having an associated timestamp. A continuous event stream may be logically represented as a bag or set of elements (s, T), where "s" represents the data portion and "T" is in the time domain. The "s" portion is generally referred to as a tuple or event. An event stream is thus a sequence of time-stamped tuples or events.

In some embodiments, the timestamps associated with events in a stream may equate to a clock time. In other embodiments, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of temporal sequence. For a system receiving an input event stream, the events arrive at the system in the order of increasing timestamps. There could be more than one event with the same timestamp.

In some embodiments, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event is used to ensure that the events in the event stream arrive in the order of increasing timestamp values. This enables events received in the event stream to be ordered and processed based upon their associated time information. In order to enable this ordering, timestamps are associated with events in an event stream in a non-decreasing manner such that a later-generated event has a later timestamp than an earlier-generated event. As another example, if sequence numbers are being used as time information, then the sequence number associated with a later-generated event is greater than the sequence number associated with an earlier-generated event. Events belonging to the same event stream are generally processed in the order imposed on the events by the associated time information, with earlier events being processed prior to later events. In some embodiments, multiple events may be associated with the same timestamp or sequence number, for example, when the worldly events represented by the data stream events occur at the same time. In these situations, the events are processed in the order received.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S", the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute (s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

```
...
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
...
```

In the above stream, for stream element (<timestamp_N+1>, <ORCL,62>), the event values for attributes "stock_symbol" and "stock_value" are ORCL and 62, respectively. The timestamp associated with the stream element is "timestamp_N+1". A continuous event stream is thus a flow of events, each event having the same series of attributes.

FIG. 1 depicts a simplified high level diagram of an event processing system 100 that may incorporate an embodiment of the present invention. Event processing system 100 may comprise one or more event sources (104, 106, 108), an event processing server (EPS) 102 that is configured to provide an environment for processing event streams, and one or more event sinks (110, 112). The event sources generate event streams that are received by EPS 102. EPS 102 may receive one or more event streams from one or more event sources. For example, as shown in FIG. 1, EPS 102 receives an input event stream 114 from event source 104, a second input event stream 116 from event source 106, and a third event stream 118 from event source 108. One or more event processing applications (120, 122, and 124) may be deployed on and be executed by EPS 102. An event processing application executed by EPS 102 may be configured to listen to one or more input event streams, process the events received via the one or more event streams based upon processing logic that selects one or more events from the input event streams as notable events. The notable events may then be sent to one or more event sinks (110, 112) in the form of one or more output event streams. For example, in FIG. 1, EPS 102 outputs an output event stream 126 to event sink 110, and a second output event stream 128 to event sink 112. In certain embodiments, event sources, event processing applications, and event sinks are decoupled from each other such that one can add or remove any of these components without causing changes to the other components.

In one embodiment, EPS 102 may be implemented as a Java server comprising a lightweight Java application container, such as one based upon Equinox OSGi, with shared services. In some embodiments, EPS 102 may support ultra-high throughput and microsecond latency for processing events, for example, by using JRockit Real Time. EPS 102 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. In one embodiment, a query may be specified to detect non-events, and generate an event stream comprising output from non-event pattern matching. Non-event detection is the detection of a situation when a certain event which should have occurred in a particular time limit does not occur in that time frame. In certain embodiments, a query for detecting non-events comprises a DURATION clause that causes a match to be reported only when a regular expression specified by the query (e.g., specified by a PATTERN clause) is matched completely and no other event or input arrives until the duration specified in the DURATION clause expires. An event received via an event stream may cause a pattern match candidate (sometimes referred to as a binding) to be started. A time duration is calculated and associated with the newly created binding. This duration associated with the binding may, for example, identify the timeframe in which the expected next event is supposed to occur. The duration is measured from the time of arrival of the event that started the pattern match. According to certain embodiments of the present invention, the duration of time computed for a first binding can be different from another binding for the same pattern being matched. In this manner, the duration for one binding can vary from the duration for another binding. Different bindings used in the context of non-event pattern matching may thus have different or variable durations associated with them.

FIG. 1 provides a drilldown for an event processing application 120 comprising a query for non-event pattern matching. As shown in FIG. 1, event processing application 120 is configured to listen to input event stream 118, execute a query 130 comprising logic for performing non-event pattern matching on input event stream 118, and output results of the non-event pattern matching via output event stream 128 to event sink 112. In non-event pattern matching, the output is triggered by a timer expiry event associated with a binding (as opposed to an explicit input event on the input stream) since non-event detection detects a situation when a certain event which should have occurred in a particular time limit does not occur in that time frame. A binding is considered expired when the duration of time associated with the binding has passed. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 120 in FIG. 1 is shown as listening to one input stream and outputting selected events via one output stream, this is not intended to be limiting. In alternative embodiments, an event processing application may be configured to listen to multiple input streams received from one or more event sources, select events from the monitored streams or detect non-events, and output the selected events or the results of non-event matching via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by EPS 102 without having to store all the received events data. Accordingly, EPS 102 provides a special querying mechanism that enables processing of events to be performed as the events are received by EPS 102 without having to store all the received events.

Event-driven applications are rule-driven and these rules may be expressed in the form of continuous queries that are used to process input streams. A continuous query may comprise instructions (e.g., business logic) that identify the processing to be performed for received events. Continuous queries may be persisted to a data store and used for processing input streams of events and generating output streams of events. Continuous queries may specify filtering and aggregation functions to discover and extract notable events from the input event streams or specify processing related to non-event pattern matching. As a result, the number of outbound events in an output event stream is generally much lower than the number of events in the input event stream from which the events are selected.

Unlike a SQL query that is run once on a finite data set, a continuous query that has been registered by an application with EPS 102 for a particular event stream may be executed each time that an event is received in that event stream. As part of the continuous query execution, EPS 102 evaluates the received event based upon instructions specified by the continuous query.

A continuous query may be programmed using different languages. In certain embodiments, continuous queries may be configured using the Continuous Query Language (CQL) provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:

(1) One or more adapters that interface directly to the input and output stream and relation sources and sinks. Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks.

(2) One or more channels that act as event processing endpoints. Among other things, channels are responsible for queuing event data until the event processing agent can act upon it.

(3) One or more application processors (or event processing agents) are configured to consume normalized event data from a channel, process it using queries to select notable events or detect non-event situations, and forward (or copy) the selected notable events to an output channel.

(4) One or more beans may be configured or registered to listen to the output channel, and may be triggered by the insertion of a new event into the output channel. In some embodiments, this user code is a plain-old-Java-object (POJO) or the user code may use Oracle CEP event bean API so that the bean can be managed by Oracle CEP. The user application can make use of a set of external services, such as JMS, Web services, and file writers, to forward the generated events to external event sinks.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, event types processed by the application. Separate files may be provided for specifying the continuous query or business logic for selection of events.

It should be appreciated that system 100 depicted in FIG. 1 may have other components than those depicted in FIG. 1. Further, the embodiment shown in FIG. 1 is only one example of a system that may incorporate an embodiment of the invention. In some other embodiments, system 100 may have more or fewer components than shown in FIG. 1, may combine two or more components, or may have a different configuration or arrangement of components. System 100 can be of various types including a personal computer, a portable device (e.g., a mobile telephone or device), a workstation, a network computer, a mainframe, a kiosk, a server, or any other data processing system. In some other embodiments, system 100 may be configured as a distributed system where one or more components of system 100 are distributed across one or more networks in the cloud.

The one or more of the components depicted in FIG. 1 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Non-Event Pattern Matching

As described above, non-event detection refers to the detection of a situation when a certain event, which should have occurred in a particular time frame, does not occur in that time frame. For example, in a scenario when events occur in a specific order, non-event detection can be used to detect the situation where a particular event which is supposed to occur next in that order in a particular timeframe does not happen within that timeframe.

In certain event processing systems, non-event detection can be accomplished using non-event pattern matching. The following are some non-limiting examples where non-event detection is applicable.

Example #1

Purchase Order Tracking Application

A purchase-order tracking system has to be capable of tracking orders where the ordered items have not been shipped even though the estimated time of delivery for the ordered items has elapsed. For example, the workflow for the purchase-order system may be: order is placed, order is processed; and ordered items are shipped and an estimated time of delivery may be provided for the orders. The application is configured to report a non-event when an order is placed, is in process, but has not yet been shipped even though the estimated time of delivery has elapsed. Here, placing an order and shipping of items may be modeled as separate events. It can be observed that the estimated time of delivery can be inherently dependent on the items being ordered and shipped since this could be different for different purchase orders depending on the items involved. This variability based upon the items being shipped cannot be modeled using conventional fixed duration non-event pattern matching but can be done using certain embodiments of the present invention. The three workflow states may be modeled as events and an event stream may be defined and received having the schema <orderId, orderDesc, eventType, estimatedTimeOfDelivery>, where eventType can have three possible values "placed", "in Process", and "shipped". The event processing application reports a non-event when an order is "placed", then is "in Process" but it has not yet "shipped" even though the "estimatedTimeOfDelivery" has elapsed after it was "placed". Certain embodiments of the present invention enable the "estimatedTimeOfDelivery" to be different for different types of orders. A CQL query for performing this non-detection is provided below.

Example #2

Airport Passenger Tracking Application

Airlines may wish to track the time when a passenger lands and when the passenger arrives at the baggage claim area. An airline may expect that upon landing the passenger shows up at the baggage claim area within a particular timeframe, say 30 minutes. This timeframe expectation may be different for different airlines. In this scenario, the landing of a passenger and the passenger's arrival at the baggage claim area may be modeled as separate events: event A for landing and event B for arrival at the baggage claim area. The landing may be modeled using a regular expression as (A). The duration for this pattern may be expressed as (T+delay), where T is the time when a passenger lands (i.e., timestamp of event A) and where "delay" is the time an airline expects the passenger to be at the baggage claim area (i.e., the occurrence of event B). The "delay" may be 30 mins for one airline, and may be airline specific. Non-events may be reported when event A occurs (i.e., the pattern is matched) but event B does not occur within the duration after occurrence of event A.

Referring back to Example #1 (Purchase Order Tracking example), a stream of events "PurchaseOrderTracking" may be received having the following schema <orderId, orderDesc, eventType, estimatedTimeOfDelivery>. As indicated above, eventType can have three possible values: "placed", "in Process" and "shipped". A CQL query may be defined for reporting a match when an order is "placed", then it is "in Process" but it has not yet been "shipped" even though the "estimatedTimeOfDelivery" has elapsed after it was "placed". Here the "estimatedTimeOfDelivery" can be different for different types of orders. The attribute "estimatedTimeOfDelivery" of "PurchaseOrderTracking" stream can stand as the DURATION sub-clause expression. In one embodiment, this can be captured using a CQL query (qDelayedShipments) having a variable duration clause as follows:

```
Create query qDelayedShipments as
SELECT
    T.id as orderId, T.desc as description
FROM PurchaseOrderTracking MATCH_RECOGNIZE(
PARTITION BY orderId
MEASURES
    A.orderId as id, A.orderDesc as desc
ALL MATCHES
INCLUDE TIMER EVENTS
PATTERN (A B) DURATION estimatedTimeOfDelivery
DEFINE
    A as A.eventType = 'placed',
    B as B.eventType = 'inProcess'
) as T
```

Here, the estimatedTimeOfDelivery is an attribute of the input event stream schema. Accordingly, for a received input event that starts a pattern match candidate for pattern (AB), the duration for that pattern match candidate is determined based upon the value of the estimatedTimeOfDelivery attribute of the input event starting the pattern.

The qDelayedShipments query comprises several CQL clauses, which are described below. In one embodiment, the CQL language construct MATCH_RECOGNIZE clause is used for performing pattern recognition in a CQL query. Using a MATCH_RECOGNIZE clause, a user can define conditions on the attributes of incoming events and identify conditions for pattern matching by using identifiers called correlation variables. A sequence of consecutive events or tuples in the input stream, each satisfying certain conditions constitutes a pattern. The pattern recognition functionality allows a user to define conditions on the attributes of incoming events or tuples and to identify these conditions by using string names called correlation variables. In the qDelayedShipments query, "A" and "B" are the correlation variables. The pattern to be matched is specified as a regular expression over these correlation variables and it determines the sequence or order in which conditions should be satisfied by different incoming events to be recognized as a valid match. A sequence of consecutive events in the input stream satisfying these conditions constitutes a pattern. In one embodiment, the output of a MATCH_RECOGNIZE query is a stream.

In query qDelayedShipments shown above, the MATCH_RECOGNIZE clause has several sub-clauses. The DEFINE sub-clause specifies the Boolean condition for each correlation variable. This may be specified as any logical or arithmetic expression and may apply any single-row or aggregate function to the attributes of events that match a condition. On receiving a new event via the input stream, the conditions of the correlation variables that are relevant at that point in time are evaluated. An event is said to have matched a correlation variable if it satisfies its defining condition. A particular input can match zero, one, or more correlation variables. The relevant conditions to be evaluated on receiving an input event are determined by the processing logic governed by the PATTERN clause regular expression and the state in pattern recognition process that has been reached after processing the earlier inputs. The condition can refer to any of the attributes of the schema of the stream or view that evaluates to a stream on which the MATCH_RECOGNIZE clause is being applied. A correlation variable in the PATTERN clause need not be specified in the DEFINE clause: the default for such a correlation variable is a predicate that is always true. Such a correlation variable matches every event.

The PARTITION BY sub-clause specifies the stream attributes by which a MATCH_RECOGNIZE clause should partition its results. Without a PARTITION BY clause, all stream attributes belong to the same partition. When a PARTITION BY clause is present along with pattern matching, the input stream is logically divided based on the attributes mentioned in the partition list and pattern matching is done within a partition.

The MEASURES sub-clause exports (e.g., makes available for inclusion in the SELECT clause) one or more attribute values of events that successfully match the pattern specified and also enables expressions to be specified on those attribute values. This clause may be used to define expressions over attributes of the events in the event stream that match the conditions (correlation variables) in the DEFINE clause and to alias these expressions so that they can suitably be used in the SELECT clause of the main query of which this MATCH_RECOGNIZE condition is a part. The attributes of an event stream may be referred to either directly or via a correlation variable.

The ALL MATCHES sub-clause is optional and used to specify how overlapping patterns are to be treated. The presence of the ALL MATCHES clause cause all the matched pattern instances on receiving a particular input to be reported. Omitting the ALL MATCHES clause causes only one pattern (the longest match) to be output. For example, if the pattern to be matched is (AB*), then ALL MATCHES will cause all matched and overlapping patterns to be output such as A, AB, ABB, ABBB. Omitting this clause will only output the longest matched pattern, i.e., ABBB.

The INCLUDE TIMER EVENTS sub-clause is used in conjunction with the DURATION clause (described below) for non-event detection queries. Typically, in most pattern match queries, a pattern match output is always triggered by an input event on the input stream over which a pattern is being matched. The exception is non-event detection queries where there could be an output triggered by a timer expiry event (as opposed to an explicit input event on the input stream).

The PATTERN sub-clause specifies the pattern to be matched as a regular expression over one or more correlation variables. Incoming events must match these conditions in the order given (from left to right). The regular expression may be composed of correlation variables and pattern qualifiers such as:

*: 0 or more times
+: 1 or more times
?: 0 or 1 time, etc.

In certain embodiments, the one-character pattern quantifiers shown above are maximal or "greedy"; they will attempt to match as many instances of the regular expression on which they are applied as possible. The pattern quantifiers can also be two characters, which are minimal or "reluctant"; they will attempt to match as few instances of the regular expression on which they are applied as possible. Examples of two character quantifiers include without limitation:

*?: 0 or more times
+?: 1 or more times
??: 0 or 1 time

As an example of pattern matching, consider the following pattern:

PATTERN (AB*C)

This pattern clause means a pattern match will be recognized when the following conditions are met by consecutive incoming input events:

State 1: Exactly one event tuple matches the condition that defines correlation variable A, followed by
State 2: Zero or more tuples that match the correlation variable B, followed by
State 3: Exactly one tuple that matches correlation variable C.

The states State 1, State 2, and State 3 represent the various states for the pattern (AB*C), with State 3 being the final state for the pattern. When a pattern match is in a particular state and can either remain in the same particular state or can transition from the particular state to the next state due to the next event, it implies that the binding can grow. A pattern is considered matched if the binding is in the final state. While in state 2, if a tuple or event arrives that matches both the correlation variables B and C (since it satisfies the defining conditions of both of them) then as the quantifier * for B is greedy, that tuple will be considered to have matched B instead of C. Accordingly, due to the greedy property B gets preference over C and we match a greater number of B. Had the pattern expression be A B*? C, one that uses a lazy or reluctant quantifier over B, then a tuple matching both B and C will be treated as matching C only. Thus C would get preference over B and we will match fewer B.

In the qDelayedShipments query above, the pattern (A B) is matched when:
State 1: Exactly one event tuple matches the condition that defines correlation variable A, i.e., an event with an eventType "placed", followed by
State 2 (Final state): Exactly one tuple that matches correlation variable B, i.e., an event with an eventType "in Process".

The states State 1 and State 2 represent the various possible states for the pattern (AB), with State 2 being the final state for the pattern.

The DURATION sub-clause is used when writing a query involving non-event detection. Using this clause, a match is reported only when the regular expression in the PATTERN clause is matched completely and no other event or input arrives until the duration specified in the DURATION clause expires. The DURATION clause has an associated time parameter that specifies the time duration for the DURATION clause, for example, DURATION <time_parameter>

The time_parameter is used to compute the time duration for a binding or a pattern match candidate (or binding) started due to an input event for a particular pattern. The time duration indicates the length of time, from the time of arrival of the event leading to the starting of the pattern match or binding, that the binding can grow.

In the past, the time_parameter was always a constant or fixed value. Certain embodiments of the present invention enable the time_parameter specified in the DURATION clause of a pattern query for non-events detection to be variable. As described above, in previous implementations, users could only have a constant or fixed value in the DURATION clause. Certain embodiments of the present invention enable the variable DURATION clause to be based upon a varying.

For example, the time_parameter of the DURATION clause may be a function of one or more attributes of an input event. For example, for the pattern (AB) in query qDelayed-Shipments, the DURATION clause time_parameter is "estimatedTimeOfDelivery" and the duration period is set to the value of the estimatedTimeOfDelivery attribute of the received event that started a match. Since the value of this attribute could be different for different events that start a match, the value of the duration specified by the DURATION clause can be different for different events. Accordingly, for an underlying input stream having a schema comprising one or more attributes, the time_parameter of the DURATION clause may be based upon one or more of the event attributes. For example, if an event "E" has an attribute "attr", then an example of the DURATION clause may be "DURATION E.attr". Here, the time_parameter is set to the value of E.attr, which causes the duration period associated with a binding resulting from receipt of event "E" to be set to the value of attribute E.attr.

As another example, the time_parameter associated with the DURATION clause may specify an expression (e.g., an arithmetic expression) that is evaluated and the result of the evaluation is the value given to resultant duration period for the DURATION clause. In some embodiments, the expression may involve one or more attributes of an event. For example, if an event "E" having attributes "attr_1", "attr_2", examples of arithmetic expressions for the time_parameter may include without limitation:

DURATION E.attr_1
DURATION E.attr_1+C, where C is some constant (e.g., E.attr_1+4)
DURATION E.attr_1+E.attr_2
DURATION 2* E.attr_2

Since the values of the attributes of the received events can be different from one event to another, evaluation of the arithmetic expression can result in different duration values for to be associated with binding resulting from matches due to the different events. Accordingly, embodiments of the present invention enable both fixed/constant or variable values for DURATION.

In the context of pattern matching, the DURATION clause is evaluated at runtime when an event arrives on the input event stream and starts a pattern match (i.e., creates a new binding) (or multiple pattern matches). The expression associated with the DURATION clause when such a binding starts and the value obtained from evaluation of the expression is identified as the duration for the binding. Accordingly, the value of this expression is treated as the DURATION value for a pattern match (if any) starting at that event.

Accordingly, a user can design a CQL query for non-event detection and specify an expression (e.g., an arithmetic expression) for the DURATION to suit the user's needs. The user is able to specify the duration of non-event detection as an arithmetic expression possibly involving one or more attributes of the base stream on which the pattern query is being defined. The use of a variable value for duration is useful when it is seen on an event-to-event basis i.e., for every input event the duration could be different.

Figure 2:
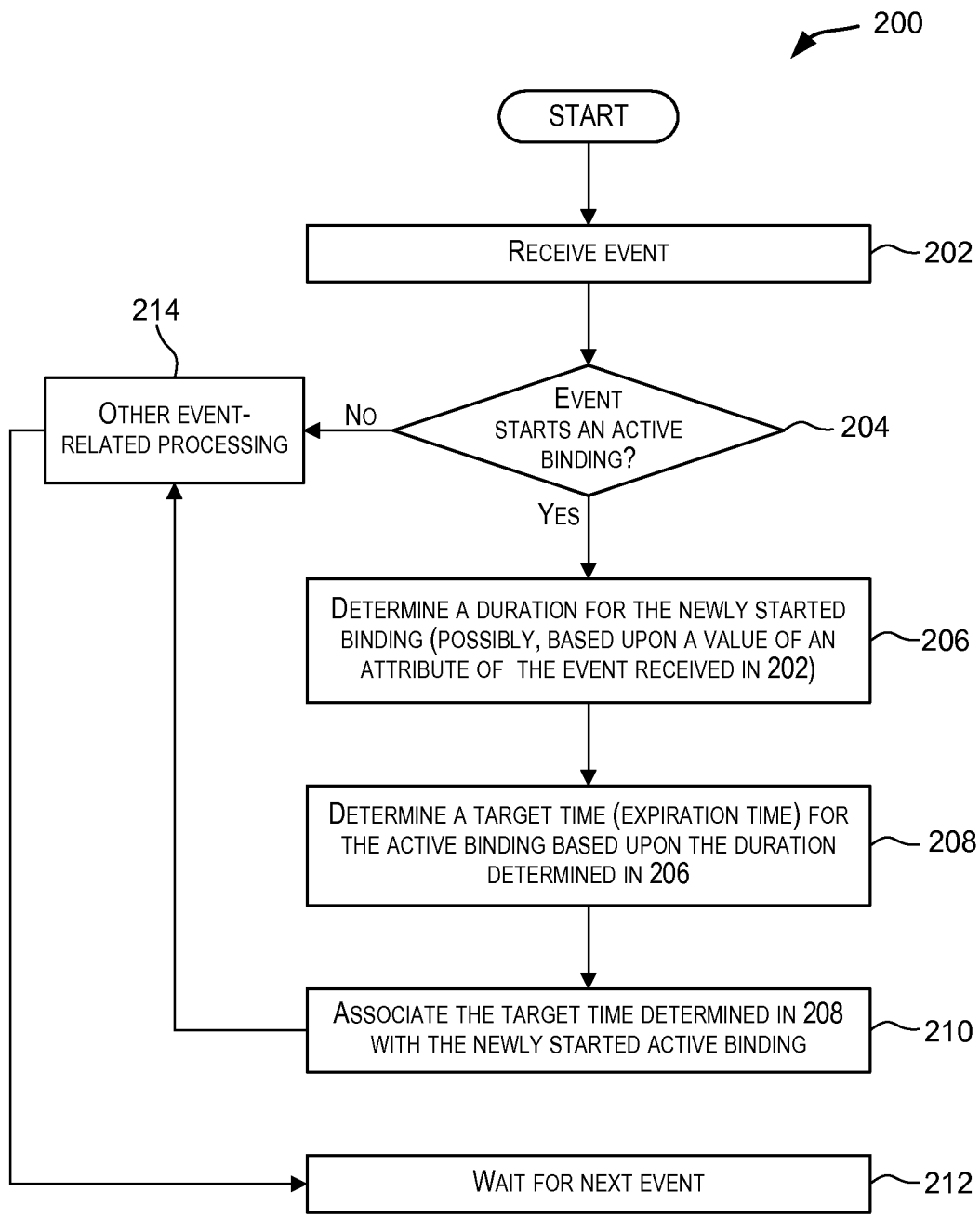
FIG. 2 depicts a simplified flowchart depicting processing performed upon receiving an event according to an embodiment of the present invention.

FIG. 2 depicts a simplified flowchart 200 depicting processing performed upon receiving an event according to an embodiment of the present invention. The processing depicted in FIG. 2 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps depicted in FIG. 2 is not intended to be limiting. In certain embodiments, the processing depicted in FIG. 2 may be performed as part of the continuous query execution each time that an input event is received via an event stream.

At 202, an input event is received via an event stream. The event may have associated time information (e.g., a timestamp). In some instances, the time associated with an event may represent the time when the event was received.

At 204, a determination is made if the event received in 202 starts a pattern match candidate (also referred to as a binding). The event starts a binding if the event causes the first correlation variable in the PATTERN to be matched. Such a match implies that a new pattern match can start at this event. If the event starts a new binding, then processing continues with 206 else processing continues with 214. Using the qDelayed-Shipments query described above as an example, the pattern is (AB), where is A is an event whose eventType is "placed" and B is an event whose eventType is "in Process". Accordingly, if an event is received in 202 whose eventType is "placed", then it starts a pattern match since the event matches the "A" part of the (AB) pattern (i.e., state 1 is satisfied). The pattern match may also be referred to as a binding. The pattern match or binding has the potential to grow further. Such a binding that has the potential to grow further is referred to as an active binding.

At 206, a duration is computed for the newly started binding. The duration for the binding is based upon the time_parameter specified in the DURATION clause in the query. The time duration identifies a period of time after which the binding expires. All events comprising the pattern match happen in the time frame specified by the duration and no other event happens after the last event contributing to a match (as per the PATTERN clause) has occurred and before the duration expires/completes. Accordingly, in 206, the time_parameter for the DURATION clause is evaluated and the result of the evaluation is the value of the time period duration.

In some cases, as in previous implementations, the time_parameter may be a fixed value. In such cases, the duration is set to that fixed value.

In certain embodiments, the time_parameter may specify a variable value. For example, the time_parameter of a DURATION clause may be based upon an attribute of an event. In other scenarios, the time_parameter may be expressed as an expression (e.g., an arithmetic expression) involving one or more attributes of the event. As part of 206, the values of these one or more attributes of the event received in 202 are determined and used to compute the duration. If an expression (e.g., an arithmetic expression) involving one or more attributes of the event has been specified, then in 206, the values of the one or more attributes are determined and used to evaluate the arithmetic expression. The duration is the result of the arithmetic expression evaluation. For example, for a DURATION clause, DURATION c1+5, where c1 is an attribute of the event, the value of attribute c1 of the event received in 202 is determined and the "c1+5" arithmetic expression evaluated using the determined value. The result of the evaluation is the time of duration for the new binding.

Since the values of the attributes can be different for different events that start a new binding, the evaluation of the arithmetic expression may result in different time period values for different bindings. In this manner, the duration time periods associated with different bindings started due to events received via the same event stream and for the same specified pattern may be different.

At 208, an expiration time (or target time) is determined for the newly started binding based upon the duration value determined in 206. The target time for the binding is obtained by adding the duration value determined in 206 to the timestamp of the event received in 202 that started the binding. Accordingly, Target time($T_T$)=Time of Event($T_E$)+Duration time period($T_D$)

For example, if the event received in 202 has an associated timestamp of 5 seconds and the duration value determined in 206 is 10 seconds, then the target time for the binding started as a result of the event is 5+10=15 second mark. The 15 second mark marks the expiration time associated with the binding.

At 210, the target time determined in 208 is associated with the newly started active binding. Processing then continues with 214.

At 214, other events-related processing triggered by the event received in 202 may be performed. For example, in one embodiment, the processing depicted in FIG. 3 may be performed as part of 214. After the processing in 214 is performed, at 212, the event processing system waits for the next event to arrive. The processing depicted in FIG. 2 may then be repeated for the next event.

Once a new binding has been generated, as subsequent events arrive, processing is performed by the event processing system to determine whether the binding will grow or get to a state where the binding cannot grow. Further, the events processing system tracks the bindings and their associated target or expiration times and performs appropriate processing when the expiration time associated with a binding has passed or expired (i.e., when the binding has expired).

Figure 3:
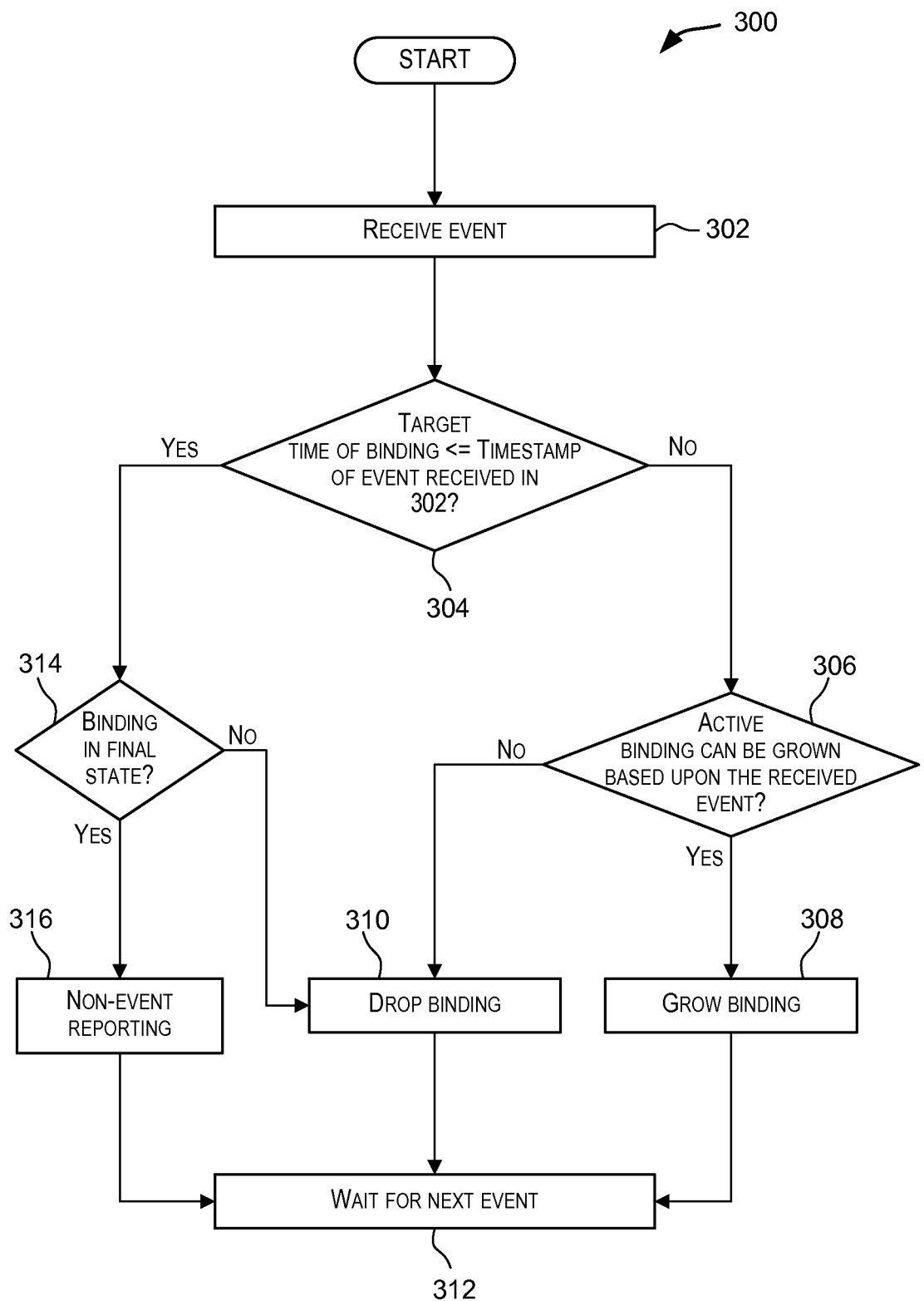
FIG. 3 depicts a simplified flowchart depicting processing performed upon receiving an event with respect to existing bindings according to an embodiment of the present invention.

FIG. 3 depicts a simplified flowchart 300 depicting processing performed upon receiving an event with respect to existing bindings according to an embodiment of the present invention. The processing depicted in FIG. 3 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps depicted in FIG. 3 is not intended to be limiting. In certain embodiments, the processing depicted in FIG. 3 may be performed as part of the continuous query execution each time that an input event is received via an event stream.

FIG. 3 shows processing with respect to a single binding that already exists. It should however be apparent that more than one binding can exist, each created due to the start of a pattern match based upon previously received events. Each of these multiple bindings may be processed by the processing depicted in FIG. 300 and described below.

At 302, an event is received via the event stream. Each event has associated time information (e.g., timestamp). This time information is used to determine whether that target time (or expiration time) associated with a preexisting binding has passed or expired, i.e., whether the binding has expired.

Accordingly, at 304, a check is made to see if the target or expiration time associated with the preexisting binding is the same as or less than the timestamp associated with the event received in 302. If it is determined in 304 that the target or expiration time associated with the preexisting binding is the same as or less than the timestamp associated with the event received in 302, then it indicates that the binding has expired and processing continues with 314, else it indicates that the binding has not expired and processing continues with 306.

At 306, a determination is made whether the active binding can be grown based upon the event received in 302. As previously described, when a binding is in a particular state of the various possible states for the pattern being matched and can either remain in the same particular state or can transition from the particular state to the next state as a result of the next event, it implies that the binding can grow. For example, a binding can be grown further if the input event received in 302 matches the next allowed variable as per the PATTERN regular expression, where the next allowed variable depends upon the point which the current active binding represents in the pattern match. Accordingly, in 306, a determination is made if the preexisting binding can be grown as a result of the event received in 302. If it is determined in 306 that the binding can grow, then the binding is grown at 308, else the binding is dropped from processing at 310. Processing then continues with 312 where the event processing system waits for the next event to arrive.

Using the qDelayedShipments query as an example, the preexisting binding being processed may be in State 1 for pattern (AB) due to the previous event having matched A. If the event received in 302 matches B of the pattern (i.e., the eventType of the event received in 302 is "in Process"), that the binding can be and is grown from A to AB (the state of the binding transitions from State 1 to State 2) in 308. However, if the event received in 302 does not match B (i.e., the eventType of the event received in 302 is not "in Process"), then the binding cannot grow and the binding is dropped from processing per 310.

Referring back to 304, if it is determined in 304 that the target or expiration time associated with the preexisting binding is the same as or less than the timestamp associated with the event received in 302, then it indicates that the binding has expired and processing continues with 314. At 314, a check is made to see if the binding is in the final state of the pattern matching states. If the binding is not in the final state, it implies that the specified pattern has not been matched within the duration associated with the binding and the binding is dropped from processing per 310. If the binding is in the final state, it implies that the specified pattern has been matched within the duration associated with the binding and, at 316, a non-event is reported. In one embodiment, the MEASURE clause identifies that information to be output. The MEASURE clause expression is thus evaluated and the information then output. Processing then continues with 312 where the system waits for the next event to arrive.

For example, for the (AB) pattern in qDelayedShipments, a check is made in 314 to see if the binding is in State 2 (i.e., AB has been matched). If not, it implies that the AB pattern has not been matched within the duration associated with the binding and the binding is dropped from processing per 310. If it is determined in 314 that the binding is in the final state (i.e., AB has been matched), then it indicates that an event was received indicating that an order has been placed (match to A) followed by an event that indicates that the order is in process (match to AB), but no following event has been received to indicate that the order has been shipped within the time duration (i.e., the estimatedTimeOfDelivery) associated with that binding. Accordingly, a non-event is reported out in this case.

The processing depicted in FIGS. 2 and 3 and described above assumes that the event received in 302 is an actual data event. In some embodiments, the event received in 302 may also be a heartbeat event, which is a special type of input event that is used to convey just time progress information. A heartbeat event does not have any value for the other attributes associated with a regular data event. An event processing system may be configured to send heartbeat events automatically at periodic intervals, which can be configured by a user of the system. Heartbeat events are then automatically generated and sent at the periodic intervals if no other actual event is received within that period (i.e., the event stream is silent for that time period). For example, for system-timestamped sources (which are frequently used in event processing applications), the period after heartbeat events are automatically sent can be specified when the stream/relation is silent for some time period. An input channel may be configured to send heartbeat tuples at configurable periods. It is to be noted that not all systems need to have a heartbeat event sending mechanism.

Since a heartbeat event does not contain any data attributes, in FIG. 2, upon receiving a heartbeat event, processing would continue with 214. Since the heartbeat event conveys passage of time information, in FIG. 3, upon receiving a heartbeat event, the processing in 304 would be performed to determine if the binding has expired. If determined to be expired then the processing would proceed with 314. If not expired, then processing would continue with 312.

The results from non-event pattern matching processing may be reported out in various ways. For example, when the ALL MATCHES sub-clause is specified, all the matched pattern instances are reported. Omitting the ALL MATCHES clause causes only one pattern (the longest match) to be output. Accordingly, appropriate processing may be performed in 316 when a non-event is reported. For example, when the ALL MATCHES CLAUSE is not present, only the longest match may be identified from among multiple overlapping bindings and longest match reported out and not the others. Additional customized methods for reporting out non-events are described below.

The processing depicted in FIG. 3 and described above can be used to handle constant or fixed period DURATION clauses (from prior implementations) or variable duration DURABLE clauses according to certain embodiments of the present invention. Accordingly, a common generalized method is provided for handling non-event detections.

Figure 4:
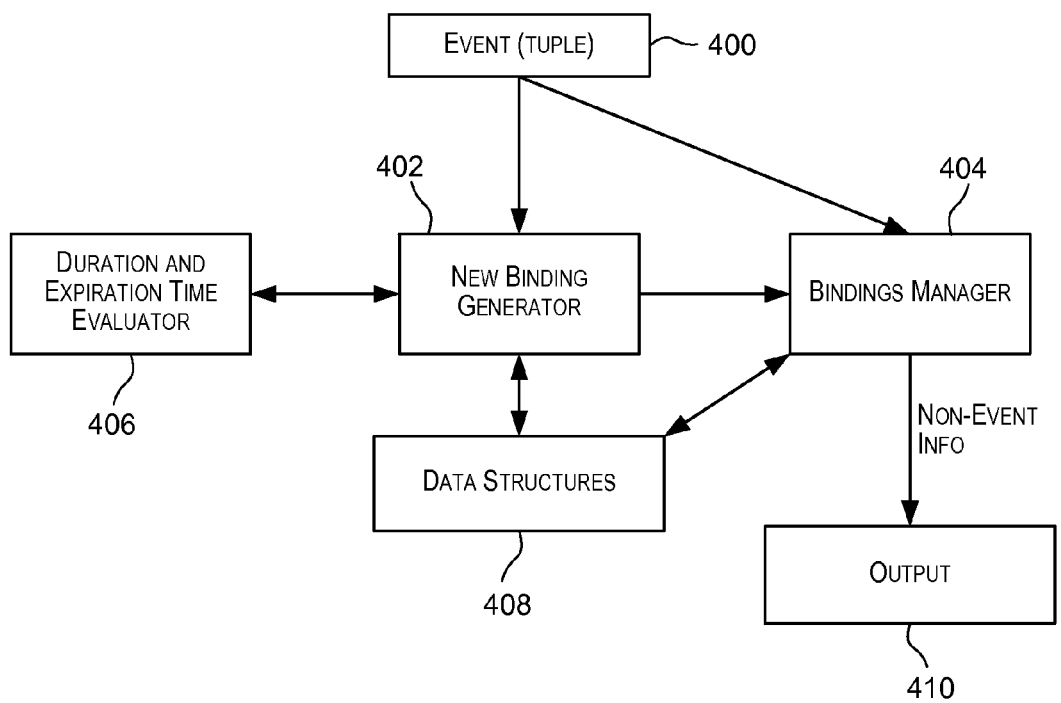
FIG. 4 depicts modules and data structures that may be used to implement non-event detection using variable duration windows according to an embodiment of the present invention.

FIG. 4 depicts modules and data structures that may be used to implement non-event detection using variable duration according to an embodiment of the present invention.

The modules depicted in FIG. 4 may be implemented in software or hardware, or combinations thereof. Further, the modules and data structures depicted in FIG. 4 are not intended to be limiting. Alternative embodiments may have more or less modules than those shown in FIG. 4 in various arrangements and combinations.

In the embodiment depicted in FIG. 4, the modules include a new binding generator 402, a bindings manager 404, a duration and expiration time evaluator 406, and an output module 410. An event 400 received by an event processing system may be forwarded to new binding generator 402 and bindings manager 404. In certain embodiments, new binding generator 402 is configured to determine if the received event starts a new binding or pattern match. If a new binding is generated, new bindings generator 402 may use duration and expiration time evaluator 406 to determine a duration for the binding and an expiration time (target time) for the binding. Duration and expiration time evaluator 406 may evaluate the time_parameter associated with the DURATION clause to determine a time of duration for the binding. Based upon the computed duration and based upon the time associated with event 400, evaluator 406 may determine a target or expiration time for the newly generated binding. New binding generator 402 may then associate the target time received from evaluator 406 with the newly generated binding. The newly generated binding and its associated target time may then be forwarded to bindings manager 404. In one embodiment, new binding generator 402 and duration and expiration time evaluator 406, in combination, are configured to perform the processing depicted in FIG. 2 and described above.

In certain embodiments, bindings manager 404 may be configured to perform processing for managing the bindings as events are received by the event processing system. For example, in one embodiment, bindings manager 404 may be configured to perform the processing depicted in FIG. 3 and described above. When a non-event is detected, bindings manager 404 may use the services of an output module 410 to report out the non-event.

The modules depicted in FIG. 4 may use various data structures 408 to facilitate the processing of events and detection of non-events. For example, new binding generator 402 and bindings manager 404 may use various data structures as part of generating new bindings and performing bindings-related processing, including detection of non-events, according to an embodiment of the present invention.

The following query (query tkpattern_q1) represent another CQL query for detecting non-events.

The use and result of a variable duration non-event pattern matching is explained using the following simple non-limiting example. Suppose that a CQL query is specified as follows:

```
create query tkpattern_q1 as select T.c2, T.p1, T.p2 from tkpattern_S
MATCH_RECOGNIZE (
PARTITION BY c2
MEASURES A.c1 as p1, B.c1 as p2, A.c2 as c2
INCLUDE TIMER EVENTS
PATTERN(A B*) DURATION c1+4 DEFINE B as B.c1 != A.c1) as T
```

In this example, the DURATION is specified as "c1+4", where "c1" is an attribute of the input event stream. The input stream is partitioned based upon the value of attribute c2 of the input event. The pattern to be matched is (AB*) and pattern matching is to be performed on a per partition basis. This pattern is matched as long as two consecutive events in a partition do not have the same value for attribute c1.

Table A shown below shows a stream of events and the output obtained from performing non-event pattern matching using a variable duration according to an embodiment of the present invention. This example is not intended to be limiting.

TABLE A

| Input Data<br>Schema: (Timestamp, c1, c2) | Output Obtained<br>Schema: (Timestamp, T.c2, T.p1, T.p2) |
|---|---|
| (1, 10, ORCL) | (9, MSFT, 4, 2) |
| (1, 10, GOOG) | (15, ORCL, 10, 15) |
| (1, 4, MSFT) | (15, GOOG, 10, 100) |
| (3, 6, MSFT) | |
| (4, 22, ORCL) | |
| (6, 444, ORCL) | |
| (7, 83, ORCL) | |
| (7, 2, MSFT) | |
| (8, 80, GOOG) | |
| (9, 88, ORCL) | |
| (10, 11, MSFT) | |
| (11, 12, ORCL) | |
| (11, 100, GOOG) | |
| (11, 22, ORCL) | |
| (11, 15, ORCL) | |
| (16, 13, ORCL) | |
| (18, 17, ORCL) | |

The output shown in Table C can be explained as follows:

(1) The event (1, 10, ORCL) marks the start of a candidate pattern match (i.e., a new binding is generated) in the partition corresponding to c2 value of "ORCL" since it matches A. At this time the duration expression c1+4 is evaluated and the duration is computed to be 14 seconds ((value of c1 of the event starting the pattern match candidate)+4=10+4=14). The expiry time for this newly generated active binding is computed to be the 15 second mark (timestamp of event starting the active binding+duration expression evaluation=1+14=15). So if the binding starting with event (1, 10, ORCL) continues to grow it will be output at its target time 15 second mark. As can be seen from the flow of events in Table A, the subsequent events in the "ORCL" partition keep matching to B (i.e., B.c1 !=A.c1) and so the pattern match AB* grows till the target time (15 second mark) is reached. When event (16, 13, ORCL) with timestamp 16 is received, it is determined (per 304 in FIG. 3) that the time of the input event is greater than the target time of 15 seconds associated with the binding in the "ORCL" partition. A check is then made to see if the binding is in the final state and it is determined that the binding is indeed in the final state (i.e., the AB* pattern has been matched). The detection of a non-event is thus reported. Per the query specified output (Timestamp, T.c2, T.p1, T.p2), the output is (15, ORCL, 10, 15).

(2) The event (1, 10, GOOG) marks the start of a candidate pattern match (i.e., a new binding is generated) in the partition corresponding to c2 value of "GOOG" since it matches A. At this time the duration expression c1+4 is evaluated and the duration is computed to be 14 seconds ((value of c1 of the event starting the pattern match candidate)+4=10+4=14). The expiry time for this newly generated active binding is computed to be the 15 second mark (timestamp of event starting the active binding+duration expression evaluation=1+14=15). So if the binding starting with event (1, 10, GOOG) continues to grow it will be output at its target time 15 second mark. As can be seen from the flow of events in Table A, the subsequent events in the "GOOG" partition keep matching to B (i.e., B.c1 !=A.c1) and so the pattern match AB* grows till the target time (15 second mark) is reached. When event (16, 13, ORCL) with timestamp 16 is received, it is determined (per 304 in FIG. 3) that the time of the input event is greater than the target time of 15 seconds associated with the binding in the "GOOG" partition. A check is then made to see if the binding is in the final state and it is determined that the binding is indeed in the final state (i.e., the AB* pattern has been matched). The detection of a non-event is thus reported. Per the query specified output (Timestamp, T.c2, T.p1, T.p2), the output is (15, GOOG, 10, 100).

(3) The event (1, 4, MSFT) marks the start of a candidate pattern match (i.e., a new binding is generated) in the partition corresponding to c2 value of "MSFT" since it matches A. At this time the duration expression c1+4 is evaluated and the duration is computed to be 8 seconds ((value of c1 of the event starting the pattern match candidate)+4=4+4=8). The expiry time for this newly generated active binding is computed to be the 9 second mark (timestamp of event starting the active binding+duration expression evaluation=1+8=9). So if the binding starting with event (1, 4, MSFT) continues to grow it will be output at its target time 9 second mark. As can be seen from the flow of events in Table A, the subsequent events in the "MSFT" partition keep matching to B (i.e., B.c1 !=A.c1) and so the pattern match AB* grows till the target time (9 second mark) is reached. When event (9, 88, ORCL) with timestamp 9 is received, it is determined (per 304 in FIG. 3) that the time of the input event is equal to the 9 seconds target time associated with the binding in the "MSFT" partition. A check is then made to see if the binding is in the final state and it is determined that the binding is indeed in the final state (i.e., the AB* pattern has been matched). The detection of a non-event is thus reported. Per the query specified output (Timestamp, T.c2, T.p1, T.p2), the output is (9, MSFT, 4, 2).

In one embodiment, the DDL for pattern clause (MATCH_RECOGNIZE) construct does not need to change. At the parser level, the DURATION sub-clause can now map to any of the following:

duration clause
      : RW_DURATION time_spec
      |RW_DURATION RW_MULTIPLES RW_OF time_spec
      |RW_DURATION non_const_arith_expr
      |RW_DURATION non_const_arith_expr time_unit Where the last two productions in the rule correspond to variable duration support. In one embodiment, the default time unit is SECONDS.

The results from non-event pattern matching processing may be reported out in various ways. In certain embodiments, special processing may be performed to ensure that the match outputs are not output out of order. For example, the following two scenarios are examples where variable duration non-event detection may cause match outputs to be reported out-of-order:

1. No partitions, ALL MATCHES
    2. Partitions, SKIP PAST LAST ROW

Output-related processing may be performed for each of the above scenarios to ensure that the results are output in order. In-order matching may be used by some event processing applications and not others. It is to be understood that the in-order related processing described below is not needed or essential to the embodiments of the present invention as recited in the claims.

(1) No Partitions, ALL MATCHES

Figure 5:
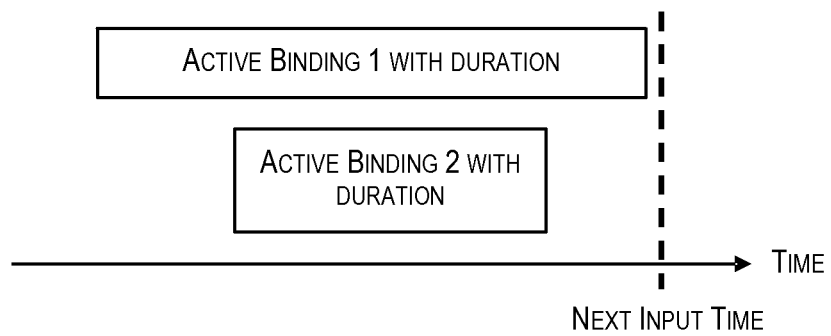
FIG. 5 depicts a possible scenario that can occur when an ALL MATCHES clause is specified according to an embodiment of the present invention.

As described above, when the ALL MATCHES clause is specified in a query, all the matched pattern instances are reported, including overlapping patterns, not just the longest match. Due to the variable nature of the durations associated with individual bindings, it is possible to have the situation described diagrammatically in FIG. 5. As shown in FIG. 5, there are two currently active bindings that have completed their respective duration time. In the scenario shown in FIG. 5, active binding 2 (the second active binding) started later than active binding 1 (the first active binding) (i.e., the timestamp associated with the event that gave rise to the second active binding is later than the timestamp associated with the event that gave rise to the first active binding) but the second binding has completed its duration earlier than the first binding that started earlier. This is because the duration determined for the second binding was smaller than the duration associated with the first binding. This can happen only with embodiments that use variable duration values.

Accordingly, in the situation in FIG. 5, a binding that started later has completed its duration earlier than the one that started earlier. Given such a situation, in certain embodiments, the desired output is in the order of the target or expiration times associated with the bindings. The problem here however is that if the bindings are processed in the normal order, i.e., the order in which the bindings were started, then this would cause the first match (i.e., the first active binding) to be output earlier than the second match (i.e., the second output binding), even though the second output binding has a lower associated target time.

In one embodiment, to ensure in-order output of the bindings for the ALL MATCHES case, a data structure (e.g., a treeset) is used to keep all the active bindings sorted in increasing order of target time. When such a data structure is iterated over, the binding with an earlier or lower target time (e.g., the second binding in FIG. 5) will be processed before a binding with a later or higher target time (e.g., the first binding in FIG. 5). This allows bindings to be output in correct order of the target times.

In certain embodiments, in order to perform in-order reporting of matches, the concept of an "unsure" binding is introduced. An unsure binding is a binding which cannot grow further and has reached final state and its associated target time has passed. It is labeled as "unsure" to indicate that even though the match has completed whether or not the binding is to be output is unsure. The target time associated with an unsure binding is referred as the matchedT time (a matchedT is associated with an unsure binding whereas a target time is for an active binding, but the value is the same). Once an active binding's target time has expired and the binding has reached the final state of the pattern (i.e., the regular expression specified by PATTERN has been matched), the binding is moved to a list of unsure bindings. A list may be also maintained of all active bindings whose durations have not expired (i.e., whose target times have not passed).

In one embodiment, the processing for the "no partitions ALL MATCHES" case may be implemented using the following data structures:

(1) Active binding TreeSet: A TreeSet is maintained storing active bindings in ascending target time order per partition. If a "partition by" clause is not specified then the entire input is treated as one partition. This is a TreeSet (to ensure ascending target time order) to avoid the out-of-order matches issue.

(2) Active item: An active item refers to one active binding and that active binding has a reference back to the active item. This is needed only if partition by is specified.

(3) ActiveItems: A TreeSet of active items is maintained only if partition by is specified. This TreeSet maintains the active items in ascending target time order and is partition independent. This allows active bindings across all partitions which have completed their target time when a new input arrives to be quickly identified.

(4) commonUnsureList: When an active binding completes its target time, it gets moved to this list of unsure bindings. These are output later.

In one embodiment, the processing performed by the EPS for handling a no partitions, ALL MATCHES scenario to ensure in-order output may comprise the following six steps as follows (the processing shown below is not intended to limits the scope of embodiments of the present invention):

1. Receive the input tuple.
2. If ("partition by" clause is specified) then, for every active item in ActiveItems (independent of whether it belongs to the current input's partition or not) having target time <=current input's timestamp, do the following:
   (a) Remove the active item from the ActiveItems data structure and also remove the referred active binding from the active bindings TreeSet of that partition.
   (b) The referred active binding has completed the PATTERN clause match and also the Duration specified (since target time <=current time of input event (ts)). So move it to the commonUnsureList.
   (c) If the partition is empty (i.e., no active bindings left) remove it.
3. If (partition by clause is not specified) OR (it is specified and the current tuple is not heartbeat tuple) then
For every active binding in current tuple's partition do the following:
   (a) If the current tuple is heartbeat tuple and the active binding's target time is greater than the heartbeat time go to step 6.
   (b) Remove the active binding from the TreeSet and from ActiveItems (if 'partition by' has been specified)
   (c) Process the active binding to see if it can be grown further.
      As indicated above, a binding can be grown further if the current input tuple matches the next allowed variable as per the PATTERN regular expression. The next allowed variable depends upon the point which the current active binding represents in the pattern match. For example, if PATTERN(ABC) is the specification and A and B have already been matched (i.e., binding represents the partial match AB) then the next allowed variable is C. So the match can be grown only if the current input tuple matches C's DEFINE clause condition.
      If the binding can be grown further then
         Insert the new (grown binding) into the data structures (ActiveItems (if maintained) and active bindings tree set of that partition)
      Else
         If the binding cannot be grown further then it gets dropped as it is already removed from the data structures.
4. If the current input is not a heartbeat tuple then:
   (a) Try to see if the current input tuple matches the first variable in the PATTERN, i.e. if a match can start at this tuple.
   (b) If yes, then
      a. Evaluate the duration clause expression using the attribute values of the current tuple and compute the duration value.
      b. Add it to the current tuple timestamp and set the result as the target time for this new active binding.
      c. Insert this binding into the active bindings TreeSet for this partition. Also construct a corresponding ActiveItem and insert it in ActiveItems data-structure (if maintained).

5. If partition by is specified then remove the current partition if it is empty.

6. Output the completed matches collected in the commonUnsureList after evaluating MEASURE clause expressions on them. During iteration the binding is removed from the commonUnsureList, so at the end of this step commonUnsureList will be empty.

(2) Partitions, SKIP PAST LAST ROW

When the ALL MATCHES clause is not specified, the pattern matching outputs the longest overlapping pattern match binding. There can be two types of overlapping pattern matches:

(a) Total overlapping—Consider a first binding for a specified pattern that started at 2000 seconds and has a target time of 8000 seconds and a second binding that started for the same pattern at 3000 seconds and has a target time of 8000 seconds. Upon expiration, if both the bindings match the specified pattern (i.e. are in the final state) then the longer first binding is preferred and output instead of the second shorter overlapping binding.

(b) Partial overlapping—Consider a first binding for a specified pattern that started at 2000 seconds and has a target time of 8000 seconds and a second binding that started for the same pattern at 5000 seconds and has a target time of 9000 seconds. Upon expiration, if both the bindings match the specified pattern (i.e. are in the final state) then the first binding with the earlier start time is preferred and output instead of the second binding.

Figure 6:
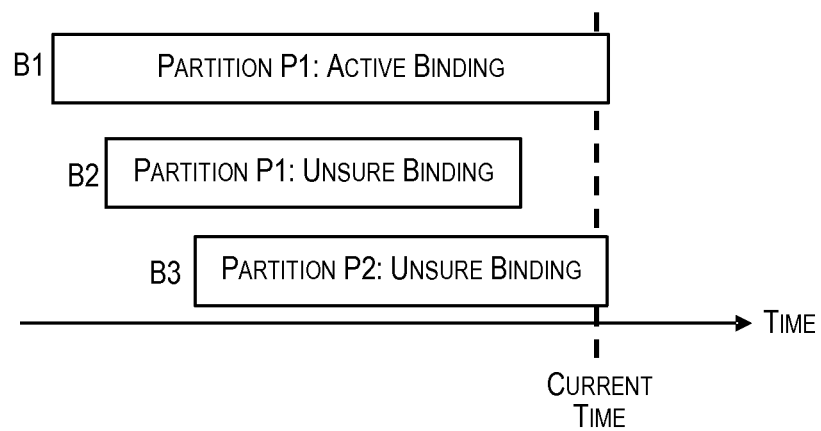
FIG. 6 depicts a possible scenario that can occur when a partitions and SKIP PAST LAST ROW clause is specified according to an embodiment of the present invention.

Due to the variability of durations computed for different bindings, it is possible to have the situation described diagrammatically in FIG. 6. Here there are bindings in two partitions P1 and P2. As shown, there is an unsure (B2) and an active binding (B1) in Partition 1. The unsure binding B2 in Partition 1 is due to it having started after the active binding B1 and it having finished its duration prior to the active binding B1 because of a smaller value of duration than the other active binding B1. This unsure binding is not to be output since the currently active binding B1 in P1 can become unsure and then it will represent the longest match.

Further, as shown in FIG. 6, the second partition P2 has a binding B3 that became unsure at the current instant. However, this binding cannot be output because, if later the active binding B1 in Partition 1 does not complete (due to any reason) and is dropped, then the unsure binding B2 in partition P1 needs to be output first. Since that has matchedTs lesser than the matchedTs of unsure binding B3 in Partition 2, this could will result in out-of-order reporting of matches.

In one embodiment, an unsureItem is maintained for every binding in unsureList and using a Treeset of such unsureItems enables one to quickly obtain the minimum matchedTs among them. This is then used to decide whether a binding should be reported or not.

In one embodiment, the data structures described above for processing the ALL MATCHES case are used with some changes. For unsure bindings, a commonUnsureList is not maintained but instead a partition-specific unsure binding list is maintained. Further, if a "partition by" clause is specified then the following additional data-structures are maintained:

(1) A priority queue called 'readyToOutputBindings' is maintained which keeps the unsure bindings that are 'ready' for output sorted in ascending order of 'matchedTs'.

(2) An unsureItem is maintained (similar to activeItem) which maps to an unsure binding. All these unsure items (independent of partition) are kept in a TreeSet called unsureItems and are sorted by matchedTs. This data-structure helps to quickly identify the minimum 'matchedTs' among all the unsure bindings across all partitions.

In one embodiment, the processing performed by the EPS for handling a partitions, SKIP PAST LAST ROWS scenario to ensure in-order output may be as follows (the processing shown below is not intended to limits the scope of embodiments of the present invention):

1. Receive the input tuple and mark the partition to which this tuple belongs as 'current partition'. If partition by is not specified then entire input is one (and 'current') partition.

2. If input tuple is heartbeat and partition by is specified, go to step 4.

3. Perform doCommonProcessing( )

4. If partition by is specified, then do doNonEventProcessing( )

5. Output the completed matches:

If partition by is NOT specified then iterate through the unsure bindings list and output after evaluating MEASURE clause expressions.

Else

Iterate through the readyToOutputBindings priority queue (sorted on matchedTs) and output all those matches for which matchedTs is less than minTs (minimum matchedTs among all the currently unsure bindings across partitions—needed to avoid the out-of-order match reporting issue) computed at step 5(b) in doCommonProcessing( ). Evaluate MEASURE clause expressions prior to output.

In certain embodiments, the processing performed in the doCommonProcesssing( ) function called above in step 3 may be as follows:

doCommonProcessing( )

NOTE: The 'current partition' could be different from the recent input's partition if this is called via doNonEventProcessing.

1. For all active bindings of the 'current partition' (maintained in target time order), do the following:

(a) if (active binding's target time>current input time) AND (current input tuple is heartbeat OR we are processing some partition other than the recent input's partition) go to step 2.

This is because if a partition is being processed other than the current tuple's partition or the input is a heartbeat then only those active bindings which have completed their target time are of interest.

(b) Remove the active binding and a corresponding active item (if maintained) from those data-structures.

(c) If

1. An unsure binding has not been found yet OR

2. An unsure binding is found but the current active binding has started earlier than the unsure binding (unsureBind) so far.

'unsureBind' contains a reference to the unsure binding which has the smallest startIndex among the possibly many bindings which can become unsure at a certain input. Since bindings with variable durations which have started at different times can end at the same time (can have same target time) and the longest among those is of interest (the one which started the earliest).

Then

Process the binding. Processing would mean trying to see if the binding can be grown further with the current input like in the ALL MATCHES case. If it can be grown, put the newly grown active binding into the maintained data-structures. If the binding becomes unsure then set a Boolean 'foundMatch' to true.

Else

The binding gets dropped.

2. If a match is found at step 1.(c) then
   (a) Add the 'unsureBind' (longest match) to the unsureList and also add unsureItem if that data-structure is being maintained.
   (b) If the recent input's partition is being processed and input is not a heartbeat then will have to later try whether the recent input matches the starting variable of the pattern. This is tracked by setting the Boolean 'applyS0trans' to true.
   (c) If we have quit at step 1.(a) then iterate through the remaining active bindings of the 'current partition' and delete all those which have started later than the unsureBind. (Since no overlapping matches allowed here those which started later than the unsureBind should be deleted).
   (d) Also delete all the unsure bindings of the 'current partition' which have started later than 'unsureBind' and hence are smaller than 'unsureBind'.
3. All the active bindings left now in the 'current partition' would have started earlier than 'unsureBind'. Get the first binding's startIndex and set it as 'minActiveIndex'. If no binding is left then set 'minActiveIndex' to Long.MAX_VALUE. This 'minActiveIndex' is used in deciding whether the 'unsureBind' can be output or not.
4. if(applyS0trans is set in step 2.(b) OR
   (If current partition is recent input's partition AND current input is not a heartbeat AND if we have not found a match at step 1.(c)) then
       Try to match the current input tuple to the first variable in the PATTERN clause to see if a match can start at this tuple.
       If yes, then
       Evaluate the duration clause expression using the attribute values of the current tuple and compute the duration value.
       Add it to the current tuple timestamp and set the result as the target time for this new active binding.
       Insert this binding into the active bindings TreeSet for this partition. Also construct a corresponding ActiveItem and insert it in ActiveItems data-structure (if maintained)
5. If (partition by is specified) then InitReportBindings:
   This step is used to ensure that we don't report out-of-order matches across partitions.
   (a) For every unsure binding in the 'current partition'
       If the binding has started earlier than the 'minActiveIndex' computed in step (3) then remove it from unsure list and move it to 'readyToOutputBindings' queue. It means there is no active binding in this partition which has started earlier than this unsure binding and so this binding is readyToOutput.
       Else
       There is some active binding which has started earlier than this unsure binding and hence can be the longest match if it completes in future so this unsure binding is still not ready to be output.
   (b) Set the minTs to be the minimum matched Ts among all the unsure bindings across all partitions. So if a binding is ready to be output but there is some unsure binding which has matchedTs <this binding's matchedTs we cannot output it. This is handled by 'minTs' and unsureItem is used to quickly compute the minTs.
6. If current partition has become empty (no active bindings left) then delete it.

In certain embodiments, the processing performed in the doNonEventProcesssing( ) function called above in step 4 (partitions, SKIP PAST LAST ROW case) may be as follows:
   doNonEventProcessing( )
       For all Active Items which have target time <=current input time
       (Essentially all those active bindings across partitions which have crossed their target time and hence will become unsure) do the following:
           (a) Set the active item's (binding's) partition as 'current partition'.
           (b) doCommonProcessing( )

As discussed above, the DURATION for a binding in non-event matching processing may be based upon one or more attributes of the event that started the binding. In certain embodiments, the attributes upon which the DURATION value is based may be part of the input event stream schema itself. However, in some embodiments, such an attribute(s) may not be part of the received input stream. In one such embodiment, the one or more attributes to be used for setting the DURATION value may be added to the event stream by deriving a new stream from the original stream where the one or more attributes upon which the duration calculation is based are part of the schema of the derived event stream.

Figure 7:
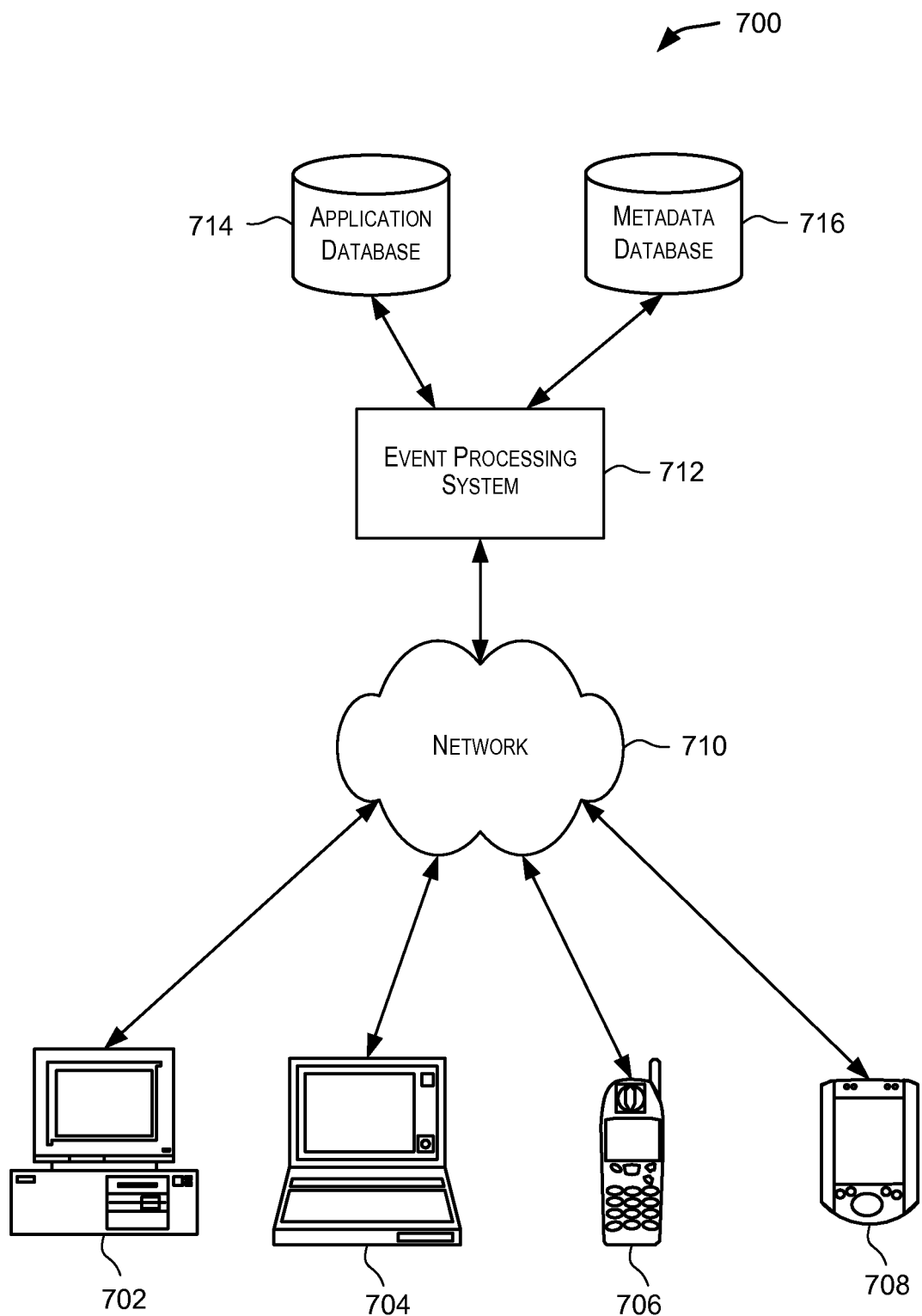
FIG. 7 is a simplified block diagram illustrating components of a system environment that may be used in accordance with an embodiment of the present invention.

FIG. 7 is a simplified block diagram illustrating components of a system environment 700 that may be used in accordance with an embodiment of the present invention. As shown, system environment 700 includes one or more client computing devices 702, 704, 706, 708, which are configured to operate a client application such as a web browser, proprietary client (e.g., Oracle Forms), or the like. In various embodiments, client computing devices 702, 704, 706, and 708 may interact with an event processing system 712.

Client computing devices 702, 704, 706, 708 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 702, 704, 706, and 708 may be any other electronic device, such as a thin-client computer, Internet-enabled gaming system, and/or personal messaging device, capable of communicating over a network (e.g., network 710 described below). Although exemplary system environment 700 is shown with four client computing devices, any number of client computing devices may be supported. Other devices such as devices with sensors, etc. may interact with system 712.

A network 710 may facilitate communications and exchange of data between clients 702, 704, 706, and 708 and event processing system 712. Network 710 may be any type of network familiar to those skilled in the art that can support data communications using any of a variety of commercially-available protocols, including without limitation TCP/IP, SNA, IPX, AppleTalk, and the like. Merely by way of example, network 710 can be a local area network (LAN) such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.1X suite of protocols, the Bluetooth protocol known in the art, and/or any other wireless protocol); and/or any combination of these and/or other networks.

Event processing system 712 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, system 712 may be adapted to run one or more services or software applications described in the foregoing disclosure.

System 712 may run an operating system including any of those discussed above, as well as any commercially available server operating system. System 712 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 700 may also include one or more databases 714 and 716. Databases 714 and 716 may reside in a variety of locations. By way of example, one or more of databases 714 and 716 may reside on a storage medium local to (and/or resident in) system 712. Alternatively, databases 714 and 716 may be remote from system 712, and in communication with system 712 via a network-based or dedicated connection. In one set of embodiments, databases 714 and 716 may reside in a storage-area network (SAN) familiar to those skilled in the art. Similarly, any necessary files for performing the functions attributed to system 712 may be stored locally on system 712 and/or remotely, as appropriate. In one set of embodiments, databases 714 and 716 may include relational databases, such as Oracle 11g, which are adapted to store, update, and retrieve data in response to SQL-formatted commands.

Figure 8:
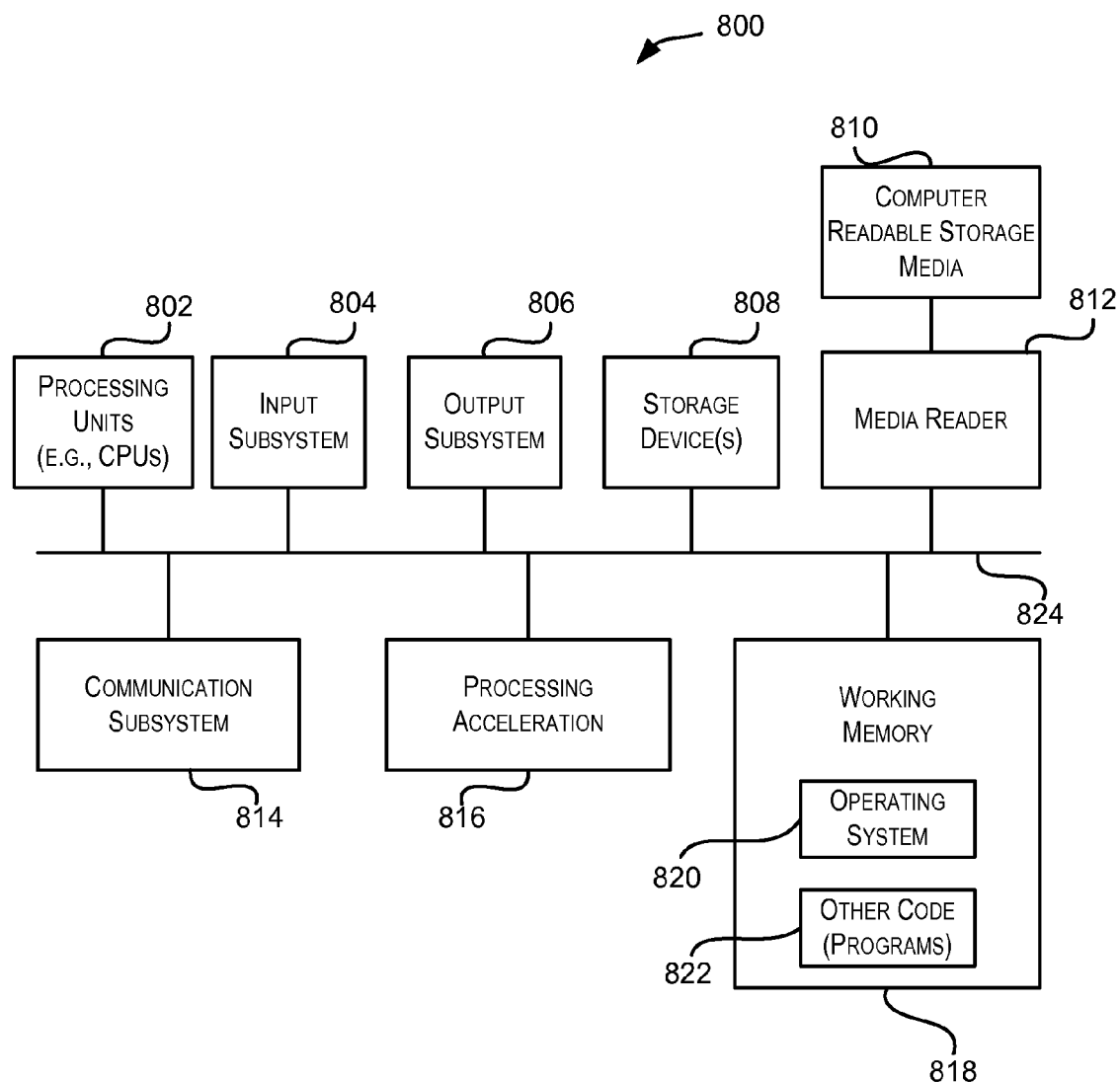
FIG. 8 is a simplified block diagram of a computer system that may be used in accordance with certain embodiments of the present invention.

FIG. 8 is a simplified block diagram of a computer system 800 that may be used in accordance with certain embodiments of the present invention. For example, system 800 may be used to implement event processing system 100 depicted in FIG. 1. Computer system 800 is shown comprising various components that may be electrically coupled via a bus 824. The components may include one or more processing units 802, an input subsystem 804, an output subsystem 806, storage devices 808, a computer-readable storage media reader 812 connected to a computer-readable storage medium 810, a communication subsystem 814, a processing acceleration subsystem 816, and working memory 818.

Bus subsystem 824 provides a mechanism for letting the various components and subsystems of computer system 800 communicate with each other as intended. Although bus subsystem 824 is shown schematically as a single bus, alternative embodiments of the bus subsystem may utilize multiple busses.

Input subsystem 804 may include one or more input devices such as a mouse, a keyboard, a pointing device, a touchpad, etc. In general, input subsystem 804 may include any device or mechanism for inputting information to computer system 800.

Output subsystem 806 may include one or more output devices for outputting information from computer system 800. Examples of output devices include without limitation a display device, a printer, a projection device, etc. In general, output subsystem 806 may include any device or mechanism for outputting information from computer system 800.

Processing unit(s) 802 can include one or more processors, one or more cores of processors, combinations thereof, and the like. In some embodiments, processing unit(s) 802 can include a general purpose primary processor as well as one or more special purpose co-processors such as graphics processors, digital signal processors, or the like. In some embodiments, some or all processing units 802 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 802 can execute instructions stored in working memory 818 or on storage devices 808. In various embodiments, processing units 802 can execute a variety of programs or code instructions and can maintain multiple concurrently executing programs or processes. At any given time, some or all of the program code to be executed can be resident in system working memory 818, storage devices 808, and/or on computer-readable storage media 810. Through suitable programming, processing units 802 can provide various functionalities described above for performing event stream-related processing. In some embodiments, computer system 800 may also include a processing acceleration unit 816, which can include a digital signal processor (DSP), a special-purpose processor, and/or the like.

Storage device(s) 808 may include memory devices such as disk drives, optical storage devices, and solid-state storage devices such as a random access memory (RAM) and/or a read-only memory (ROM), which can be programmable, flash-updateable and/or the like. Software (programs, code modules, instructions), which when executed by processing unit(s) 802 to provide the functionality described above, may be stored on storage devices 808. Storage devices 808 may also provide a repository for storing data used in accordance with embodiments of the present invention.

Computer-readable storage media reader 812 can further be connected to a computer-readable storage medium 810, together (and, optionally, in combination with storage device(s) 808) comprehensively representing remote, local, fixed, and/or removable memory storage devices plus storage media for temporarily and/or more permanently containing computer-readable information.

Communications subsystem 814 may permit data to be exchanged with network 710 and/or any other computers described above with respect to system environment 700. Communication subsystem 814 serves as an interface for receiving data from and transmitting data to other systems from computer system 800. The communication may be provided using wired or wireless protocols. For example, communication subsystem 814 may enable computer 800 to connect to a client device via the Internet. Communication subsystem 814 may comprise a modem, a network card (wireless or wired), an infra-red communication device, a GPS receiver, etc.

Working memory subsystem 818 may include a number of memories including a main random access memory (RAM) for storage of instructions and data during program execution and a read only memory (ROM) in which fixed instructions are stored. Software elements such as an operating system 820 and/or other code 822, such as an application program (which may be a client application, Web browser, mid-tier application, RDBMS, etc.), may be stored in working memory 818. In an exemplary embodiment, working memory 818 may include executable code and associated data structures (such as caches) used for processing events and enabling variable duration windows processing as described above.

It should be appreciated that alternative embodiments of computer system 800 may have more or less components with numerous variations from that described above. For example, customized hardware might also be used and/or particular elements might be implemented in hardware, software (including portable software, such as applets), or both. Further, connection to other computing devices such as network input/output devices may be employed.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
   determining, by a computing device, that a first event received by the computing device via an event stream causes a first pattern match candidate to be started for a pattern;
   computing, by the computing device, a first duration for the first pattern match candidate;
   determining, by the computing device, a first expiration time for the first pattern match candidate based upon a first time associated with the first event and the first duration;
   associating, by the computing device, the first expiration time with the first pattern match candidate;
   determining, by the computing device, that a second event received via the event stream causes a second pattern match candidate to be started for the pattern;
   computing, by the computing device, a second duration for the second pattern match candidate, the second duration being different from the first duration;
   determining, by the computing device, a second expiration time for the second pattern match candidate based upon a second time associated with the second event and the second duration; and
   associating, by the computing device, the second expiration time with the second pattern match candidate.

2. The method of claim 1 wherein:
   the first event and the second event comprise an attribute;
   computing the first duration comprises:
      determining a first value of the attribute of the first event; and
      using the first value to compute the first duration; and
   computing the second duration comprises:
      determining a second value of the attribute of the second event, the second value being different from the first value; and
      using the second value to compute the second duration.

3. The method of claim 1 wherein:
   the first event and the second event comprise an attribute;
   computing the first duration comprises:
      determining a first value of the attribute of the first event; and
      evaluating an expression using the first value to compute the first duration; and
   computing the second duration comprises:
      determining a second value of the attribute of the second event, the second value being different from the first value; and
      evaluating the expression using the second value to compute the second duration.

4. The method of claim 1 further comprising:
   determining, after the first time duration for the first event has passed, whether the first pattern match candidate has matched the pattern; and
   upon determining that the first pattern match candidate has matched the pattern, outputting information indicative of a non-event occurrence corresponding to the first pattern match candidate.

5. The method of claim 1, further comprising:
   determining, at or after the first expiration time associated with the first pattern match candidate, whether the first pattern match candidate has matched the pattern; and
   upon determining that the first pattern match candidate has matched the pattern, outputting information indicative of a non-event occurrence corresponding to the first pattern match candidate.

6. A computing device comprising:
   a memory; and
   a set of processing units, wherein one or more processing units from the set of processing units are adapted to:
      determine that a first event received by the computing device via an event stream causes a first pattern match candidate to be started for a pattern;
      compute a first duration for the first pattern match candidate;
      determine a first expiration time for the first pattern match candidate based upon a first time associated with the first event and the first duration;
      associate the first expiration time with the first pattern match candidate;

determine that a second event received via the event stream causes a second pattern match candidate to be started for the pattern;

compute a second duration for the second pattern match candidate, the second duration being different from the first duration;

determine a second expiration time for the second pattern match candidate based upon a second time associated with the second event and the second duration; and associate the second expiration time with the second pattern match candidate.

7. The computing device of claim 6 wherein the one or more processing units from the set of processing units are adapted to:

determine a first value of an attribute of the first event; and use the first value to compute the first duration;

determine a second value of the attribute of the second event, the second value being different from the first value; and use the second value to compute the second duration.

8. The computing device of claim 6 wherein the one or more processing units from the set of processing units are adapted to:

determine a first value of an attribute of the first event; and evaluate an expression using the first value to compute the first duration;

determine a second value of the attribute of the second event, the second value being different from the first value; and evaluating the expression using the second value to compute the second duration.

9. The computing device of claim 6 wherein the one or more processing units from the set of processing units are further adapted to:

determine, after the first time duration for the first event has passed, whether the first pattern match candidate has matched the pattern; and upon determining that the first pattern match candidate has matched the pattern, output information indicative of a non-event occurrence corresponding to the first pattern match candidate.

10. The computing device of claim 6 wherein the one or more processing units from the set of processing units are adapted to:

determine the first expiration time by adding the first duration to the first time associated with the first event; and determine the second expiration time by adding the second duration to the second time associated with the second event.

11. The computing device of claim 6 wherein the one or more processing units from the set of processing units are further adapted to: determine, at or after the first expiration time associated with the first pattern match candidate, whether the first pattern match candidate has matched the pattern; and upon determining that the first pattern match candidate has matched the pattern, output information indicative of a non-event occurrence corresponding to the first pattern match candidate.

12. A non-transitory computer-readable memory storing a plurality of instructions executable by one or more processing units, the plurality of instructions comprising:

instructions that cause at least one processing unit from the one or more processing units to determine that a first event received via an event stream causes a first pattern match candidate to be started for a pattern;

instructions that cause at least one processing unit from the one or more processing units to compute a first duration for the first pattern match candidate;

instructions that cause at least one processing unit from the one or more processing units to determine a first expiration time for the first pattern match candidate based upon a first time associated with the first event and the first duration;

instructions that cause at least one processing unit from the one or more processing units to associate the first expiration time with the first pattern match candidate;

instructions that cause at least one processing unit from the one or more processing units to determine that a second event received via the event stream causes a second pattern match candidate to be started for the pattern;

instructions that cause at least one processing unit from the one or more processing units to compute a second duration for the second pattern match candidate, the second duration being different from the first duration;

instructions that cause at least one processing unit from the one or more processing units to determine a second expiration time for the second pattern match candidate based upon a second time associated with the second event and the second duration; and instructions that cause at least one processing unit from the one or more processing units to associate the second expiration time with the second pattern match candidate.

13. The non-transitory computer-readable memory of claim 12 wherein:

the instructions that cause at least one processing unit from the one or more processing units to compute the first duration comprise:

instructions that cause at least one processing unit from the one or more processing units to determine a first value of an attribute of the first event; and instructions that cause at least one processing unit from the one or more processing units to use the first value to compute the first duration; and the instructions that cause at least one processing unit from the one or more processing units to compute the second duration comprise:

instructions that cause at least one processing unit from the one or more processing units to determine a second value of the attribute of the second event, the second value being different from the first value; and instructions that cause at least one processing unit from the one or more processing units to use the second value to compute the second duration.

14. The non-transitory computer-readable memory of claim 12 wherein:

the instructions that cause at least one processing unit from the one or more processing units to compute the first duration comprise:

instructions that cause at least one processing unit from the one or more processing units to determine a first value of an attribute of the first event; and instructions that cause at least one processing unit from the one or more processing units to evaluate an expression using the first value to compute the first duration; and instructions that cause at least one processing unit from the one or more processing units to compute the second duration comprise:

instructions that cause at least one processing unit from the one or more processing units to determine a second value of the attribute of the second event, the second value being different from the first value; and instructions that cause at least one processing unit from the one or more processing units to evaluate the expression using the second value to compute the second duration.

15. The non-transitory computer-readable memory of claim 12 wherein the plurality of instructions further comprises:
   instructions that cause at least one processing unit from the one or more processing units to determine, after the first time duration for the first event has passed, whether the first pattern match candidate has matched the pattern; and
   instructions that cause at least one processing unit from the one or more processing units to, upon determining that the first pattern match candidate has matched the pattern, output information indicative of a non-event occurrence corresponding to the first pattern match candidate.

16. The non-transitory computer-readable memory of claim 12 wherein:
   the instructions that cause at least one processing unit from the one or more processing units to determine the first expiration time comprise instructions that cause at least one processing unit from the one or more processing units to determine the first expiration time by adding the first duration to the first time associated with the first event; and
   the instructions that cause at least one processing unit from the one or more processing units to determine the second expiration time comprise instructions that cause at least one processing unit from the one or more processing units to determine the second expiration time by adding the second duration to the second time associated with the second event.

17. The non-transitory computer-readable memory of claim 12 wherein the plurality of instructions further comprises:
   instructions that cause at least one processing unit from the one or more processing units to determine, at or after the first expiration time associated with the first pattern match candidate, whether the first pattern match candidate has matched the pattern; and
   instructions that cause at least one processing unit from the one or more processing units to, upon determining that the first pattern match candidate has matched the pattern, output information indicative of a non-event occurrence corresponding to the first pattern match candidate.

* * * * *

UNITED STATES PATENT AND TRADEMARK OFFICE
CERTIFICATE OF CORRECTION

PATENT NO. : 9,098,587 B2
APPLICATION NO. : 13/839288
DATED : August 4, 2015
INVENTOR(S) : Deshmukh et al.

It is certified that error appears in the above-identified patent and that said Letters Patent is hereby corrected as shown below:

On the title page,

On page 5, column 1, under Other Publications, line 52, delete "Serverver" and insert -- Server, ver. --, therefor.

On page 5, column 1, under Other Publications, line 69, delete "(pri nter).aspx," and insert -- (printer).aspx, --, therefor.

On page 8, column 1, under Other Publications, line 53, delete "Retrievd" and insert -- Retrieved --, therefor.

In the specification,

In column 9, line 62, delete ""in Process","" and insert -- "inProcess", --, therefor.

In column 9, line 64, delete ""in Process"" and insert -- "inProcess" --, therefor.

In column 10, line 31, delete ""in Process"" and insert -- "inProcess" --, therefor.

In column 10, lines 32-33, delete ""in Process"" and insert -- "inProcess" --, therefor.

In column 12, line 67, delete ""in Process"." and insert -- "inProcess". --, therefor.

In column 16, line 49, delete ""in Process")," and insert -- "inProcess"), --, therefor.

In column 16, line 53, delete ""in Process")," and insert -- "inProcess"), --, therefor.

In column 22, line 32, after "specified)" insert -- . --.

Signed and Sealed this
Twenty-first Day of June, 2016

Michelle K. Lee
*Director of the United States Patent and Trademark Office*

CERTIFICATE OF CORRECTION (continued)
U.S. Pat. No. 9,098,587 B2

In column 24, line 11, after "doCommonProcessing( )" insert -- . --.

In column 24, lines 12-13, after "doNonEventProcessing( )" insert -- . --.

In column 24, line 26, delete "Processsing( )" and insert -- Processing( ) --, therefor.

In column 25, line 43, after "(if maintained)" insert -- . --.

In column 26, line 4, delete "Processsing( )" and insert -- Processing( ) --, therefor.

In column 26, line 14, after "doCommonProcessing( )" insert -- . --.